(12) United States Patent
Inagaki

(10) Patent No.: US 8,373,915 B2
(45) Date of Patent: Feb. 12, 2013

(54) OPTICAL SCANNING DEVICE

(75) Inventor: Yoshihiro Inagaki, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 49 days.

(21) Appl. No.: 13/165,554

(22) Filed: Jun. 21, 2011

(65) Prior Publication Data

US 2011/0310456 A1    Dec. 22, 2011

(30) Foreign Application Priority Data

Jun. 22, 2010    (JP) .................................. 2010-141558

(51) Int. Cl.
*G02B 26/08*    (2006.01)
(52) U.S. Cl. .................................................... 359/212.2
(58) Field of Classification Search ..... 359/196.1–218.1
See application file for complete search history.

(56) References Cited

U.S. PATENT DOCUMENTS

| | | | |
|---|---|---|---|
| 5,598,292 | A | 1/1997 | Yoshikawa et al. |
| 7,477,437 | B1 | 1/2009 | Inagaki et al. |
| 7,876,485 | B2 * | 1/2011 | Mochizuki ................. 359/204.1 |
| 8,203,774 | B2 * | 6/2012 | Inagaki ...................... 359/216.1 |
| 2008/0192320 | A1 | 8/2008 | Mochizuki | |

FOREIGN PATENT DOCUMENTS

| | | |
|---|---|---|
| EP | 0 351 011 | 1/1990 |
| GB | 2 416 946 | 2/2006 |
| JP | 5-241094 | 9/1993 |
| JP | 2001-208995 | 8/2001 |
| JP | 2008-94084 | 4/2008 |
| JP | 2009-42605 | 2/2009 |
| WO | WO-2004/083934 | 9/2004 |

OTHER PUBLICATIONS

European Communication dated Oct. 5, 2011, directed to European Application No. 11170956.4; 7 pages.

* cited by examiner

*Primary Examiner* — Euncha Cherry
(74) *Attorney, Agent, or Firm* — Morrison & Foerster LLP

(57) ABSTRACT

An optical scanning device for scanning a photoreceptor surface with a beam, said optical scanning device having: a light source for emitting the beam; an optical system for causing the beam emitted from the light source to converge; and a deflector that includes a polygon mirror with a plurality of reflecting surfaces and that deflects the beam that has passed through the optical system by rotations of the polygon mirror. Between the deflector and the photoreceptor surface, no optical system for causing the beam to converge or diverge is disposed. The optical system for causing the beam emitted from the light source to converge generates spherical aberration depending on which part of the optical system in a main-scanning direction the beam passes through. The beam enters into three or more adjacent reflecting surfaces of the polygon mirror at a time.

6 Claims, 21 Drawing Sheets

F I G. 1
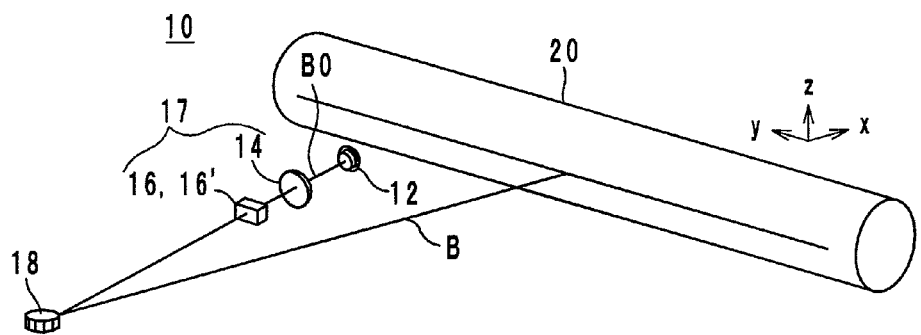
F I G. 2
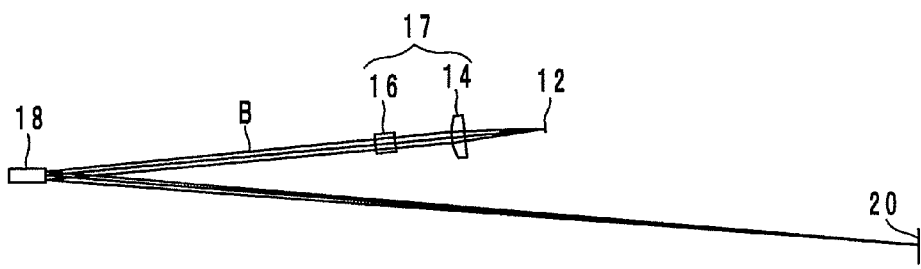

F I G. 3
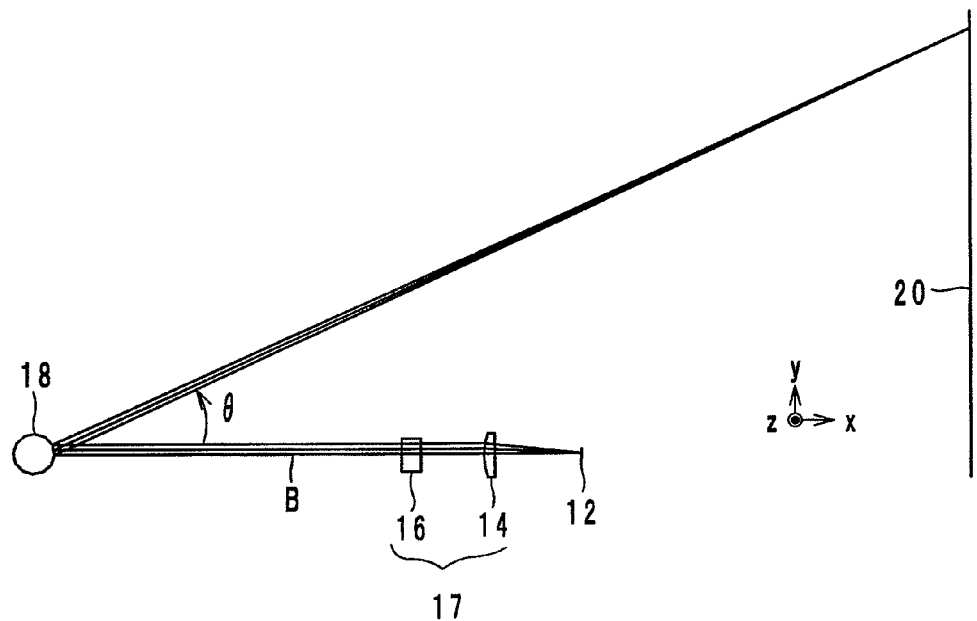
F I G. 4
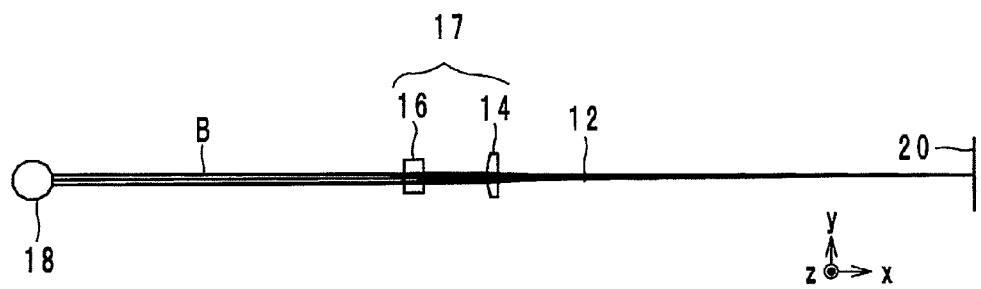

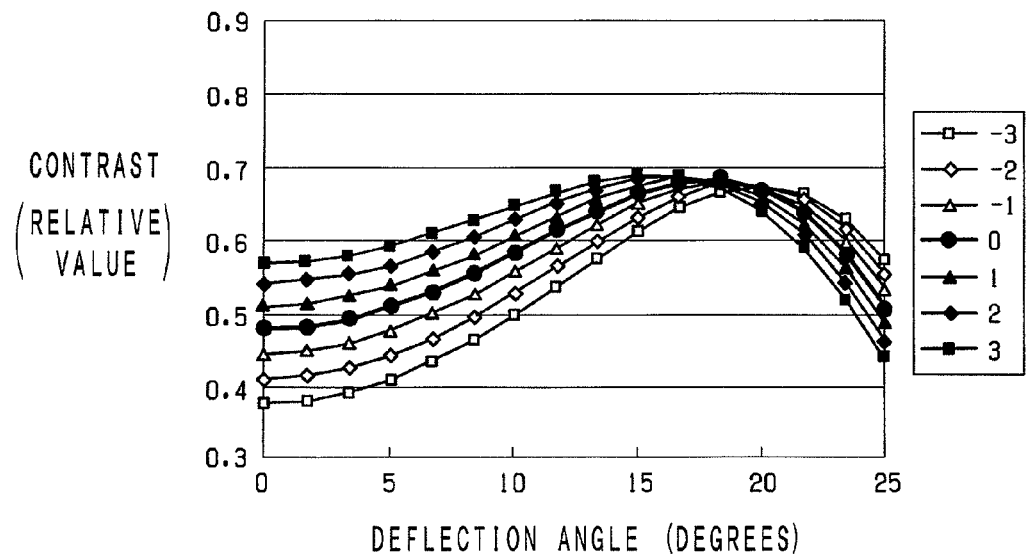
F I G. 1 6
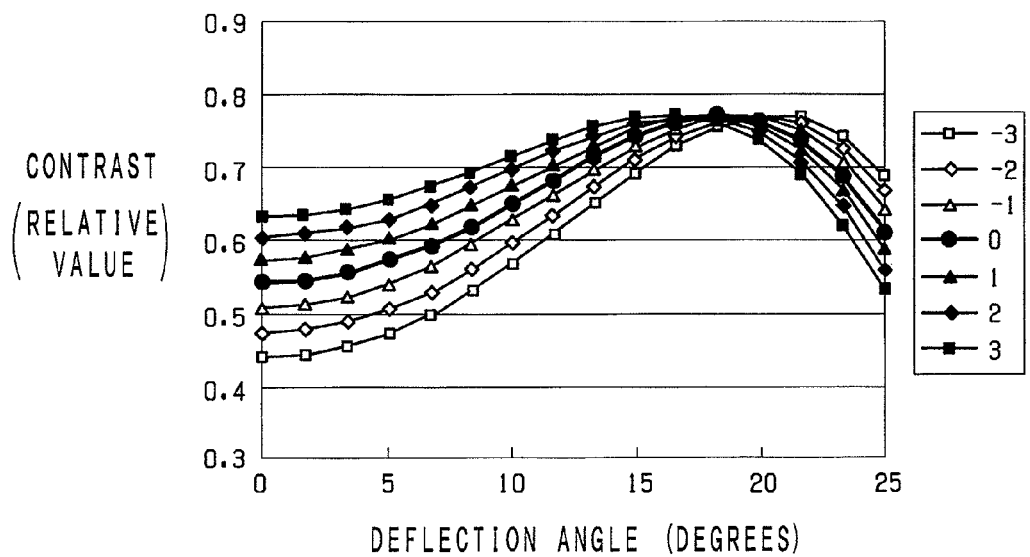
F I G. 1 7

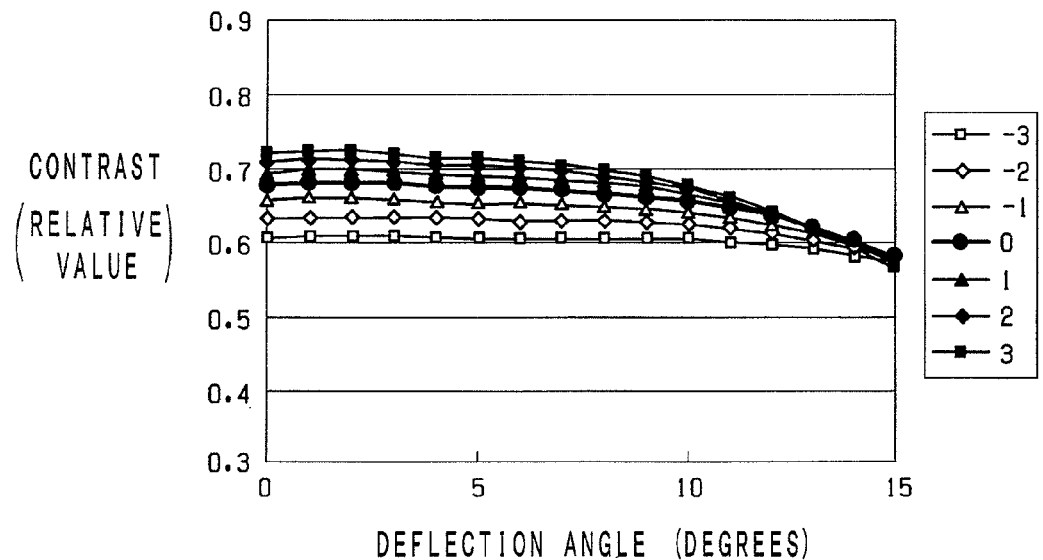
F I G . 2 4
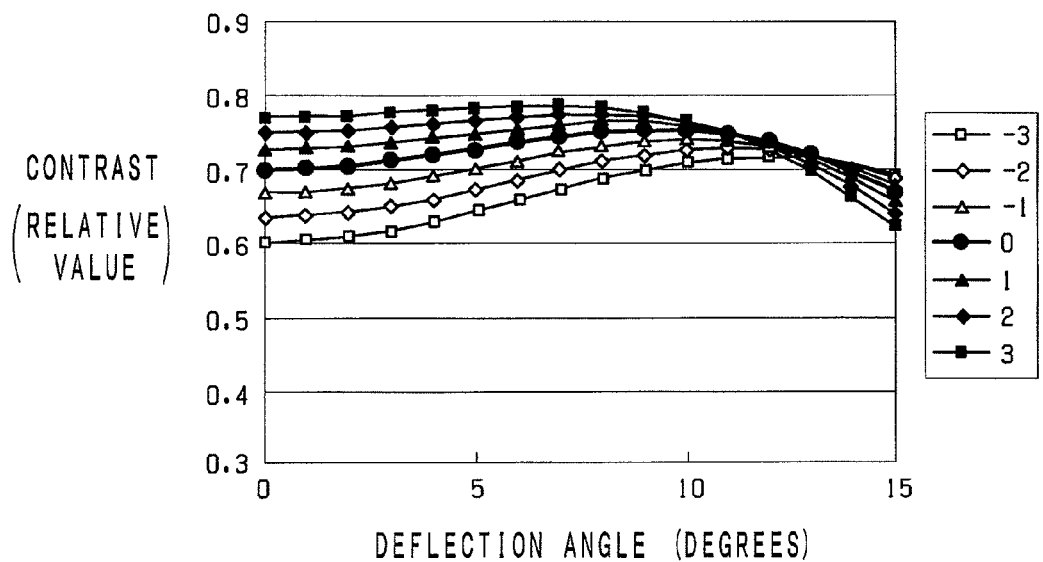
F I G . 2 5

F I G. 3 5
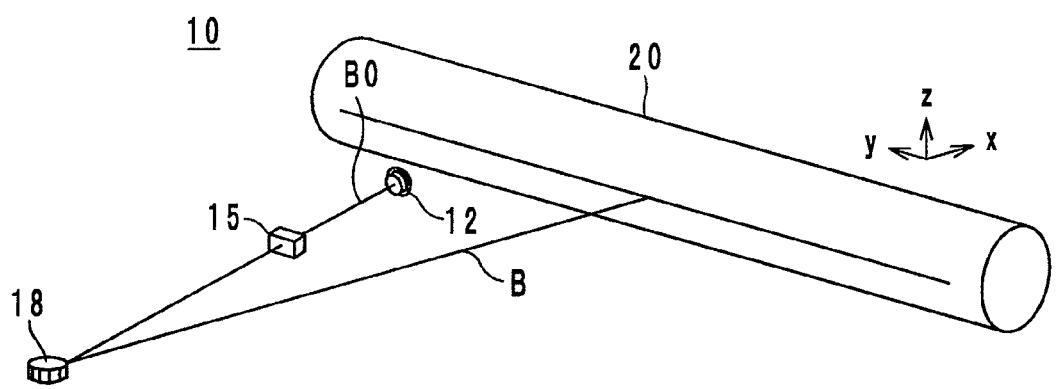

OPTICAL SCANNING DEVICE

This application is based on Japanese Patent Application No. 2010-141558 filed on Jun. 22, 2010, the content of which is incorporated herein by reference.

BACKGROUND OF THE INVENTION

1. Filed of the Invention

The present invention relates to an optical scanning device, and more particularly to an optical scanning device for irradiating a photosensitive drum with a light beam to form an electrostatic latent image on the photosensitive drum.

2. Description of Related Art

An example of well-known conventional optical scanning devices is a post-objective type optical scanning device (which will be hereinafter referred to merely as an optical scanning device) as disclosed by Japanese Patent Laid-Open Publication No. 5-241094. In the optical scanning device, a polygon mirror having cylindrical or spherical reflecting surfaces is employed, and thereby, the necessity of providing a scanning lens between the polygon mirror and the photosensitive drum is eliminated.

However, since the reflecting surfaces of the polygon mirror are not planar, the manufacturing cost of the optical scanning device is high.

SUMMARY OF THE INVENTION

An object of the present invention is to provide an optical scanning device that is less costly to manufacture.

According to an embodiment of the present invention, an optical scanning device for scanning a photoreceptor surface with a beam comprises: a light source for emitting the beam; an optical system for causing the beam emitted from the light source to converge; a deflector that includes a polygon mirror with a plurality of reflecting surfaces and that deflects the beam that has passed through the optical system by rotations of the polygon mirror; wherein no optical system for causing the beam to converge or diverge is disposed between the deflector and the photoreceptor surface; wherein the optical system generates spherical aberration depending on which part of the optical system in a main-scanning direction the beam passes through; and wherein the beam enters into three or more adjacent reflecting surfaces of the polygon mirror at a time.

BRIEF DESCRIPTION OF THE DRAWINGS

This and other objects and features of the present invention will be apparent from the following description with reference to the accompanying drawings, in which:

FIG. 1 is a structural view of an optical scanning device according to a first embodiment of the present invention;

FIG. 2 is a plan view of the optical scanning device from y direction;

FIG. 3 is a plan view of the optical scanning device from z direction;

FIG. 4 is a plan view of the optical scanning device from z direction;

FIG. 16 is a graph showing the relationship between vertical-line contrast and deflection angle $\theta$ in the first comparative example;

FIG. 17 is a graph showing the relationship between horizontal-line contrast and deflection angle $\theta$ in the first comparative example;

FIG. 24 is a graph showing the relationship between vertical-line contrast and deflection angle $\theta$ in the second example of the optical scanning device;

FIG. 25 is a graph showing the relationship between horizontal-line contrast and deflection angle $\theta$ in the second example of the optical scanning device;

FIG. 35 is a structural view of an optical scanning device according to a third embodiment of the present invention;

DETAILED DESCRIPTION OF THE PREFERRED EMBODIMENTS

Figure 5:
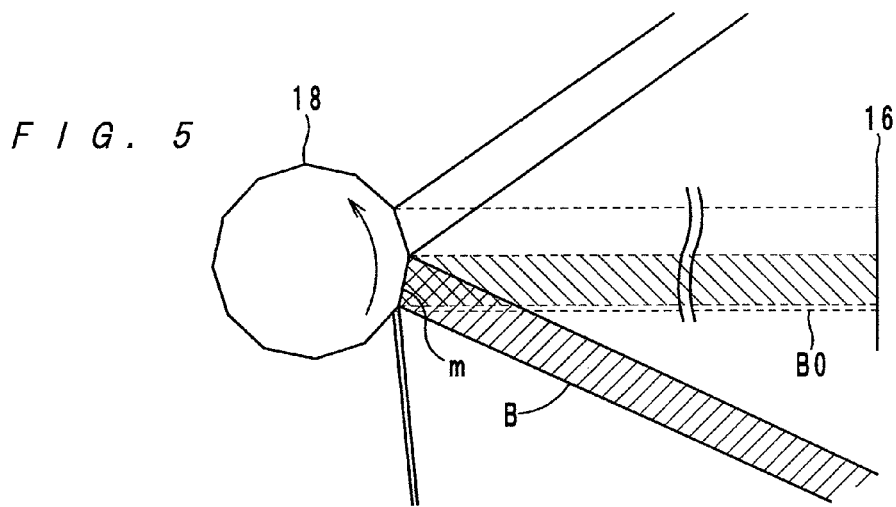
FIG. 5 is an illustration of a deflector and a beam B.

Optical scanning devices according to some embodiments of the present invention will be described.

First Embodiment

Structure of the Optical Scanning Device

An optical scanning device according to a first embodiment of the present invention will be described with reference to the accompanying drawings. FIG. 1 is a structural view of the optical scanning device 10 according to the first embodiment. In FIG. 1, a main-scanning direction on a photosensitive drum 20 is referred to as y direction, and a direction in which a rotary shaft of a polygon mirror extends is referred to as z direction. A direction that is orthogonal to the y direction and to the z direction is referred to as x direction. FIG. 2 is a plan view of the optical scanning device 10 from the y direction.

The optical scanning device 10 is to scan a beam B on the photosensitive drum 20 in the y direction. As shown in FIGS. 1 and 2, the optical scanning device 10 comprises a light source 12, a collimator lens 14, a free-form-surface lens 16 and a deflector 18. The light source 12, which is, for example, a laser diode, emits a beam B0.

The collimator lens 14 and the free-form-surface lens 16 form an optical system 17 for causing the beam B0 that is a divergent light to converge and to be focused onto the photosensitive drum 20. The collimator lens 14 is an axisymmetric aspherical lens made of glass. The free-form-surface lens 16 is a non-axisymmetric lens made of resin. The free-form-surface lens 16 has a free-form surface on the side closer to the light source 12. The free-form surface is of a rotationally asymmetric shape. More specifically, the free-form surface has two symmetric surfaces of which normal lines are orthogonal to each other. The normal line of one of the two surfaces is orthogonal to a rotation axis of a polygon mirror comprised in the deflector 18.

The polygon mirror comprised in the deflector 18 has a plurality of reflecting surfaces. After passing through the collimator lens 14 and the free-form-surface lens 16, the beam B is deflected with rotations of the polygon mirror. The beam B is a part of a beam B0, and this will be described later.

Between the deflector 18 and the photosensitive drum 20, there are provided no optical elements, such as lenses and mirrors, for causing the beam B to converge.

The photosensitive drum 20 is driven to rotate at a specified velocity. The beam B is main-scanned by the rotations of the polygon mirror and sub-scanned by the rotations of the photosensitive drum 20, and thereby, a two-dimensional electrostatic latent image is formed.

In the optical scanning device 10, as described below, the optical path length of the beam B from the output surface of the free-form-surface lens 16 to the surface of the photosensitive drum 20 depends on the irradiation point of the photosensitive drum 20. FIGS. 3 and 4 are plan views of the optical scanning device 10 from z direction. FIG. 3 shows the state where the negative edge in y direction of the photosensitive drum 20 is irradiated with the beam B. FIG. 4 shows the state where the center in y direction of the photosensitive drum 20 is irradiated with the beam B. In the following, when viewed from z direction, the angle of the beam B to x axis is referred to as a deflection angle θ. The deflection angle θ has positive values in the counterclockwise direction.

Figure 6:
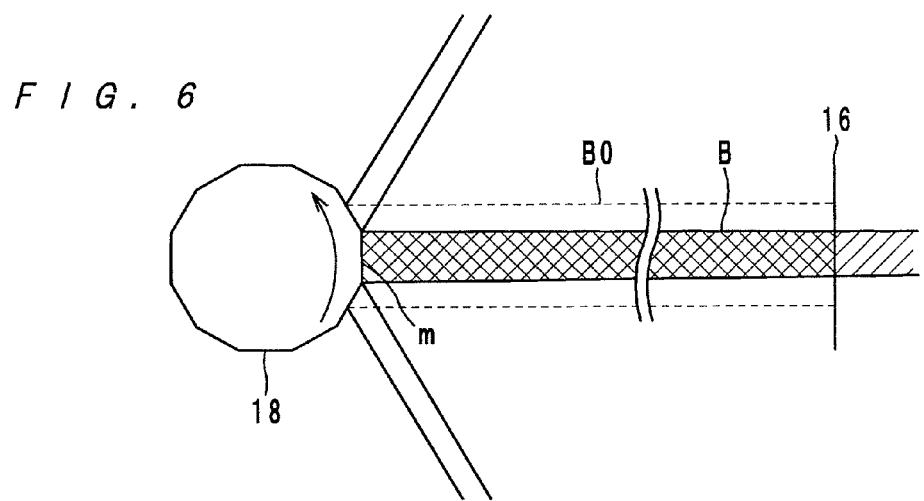
FIG. 6 is an illustration of the deflector and the beam B.
Figure 7:
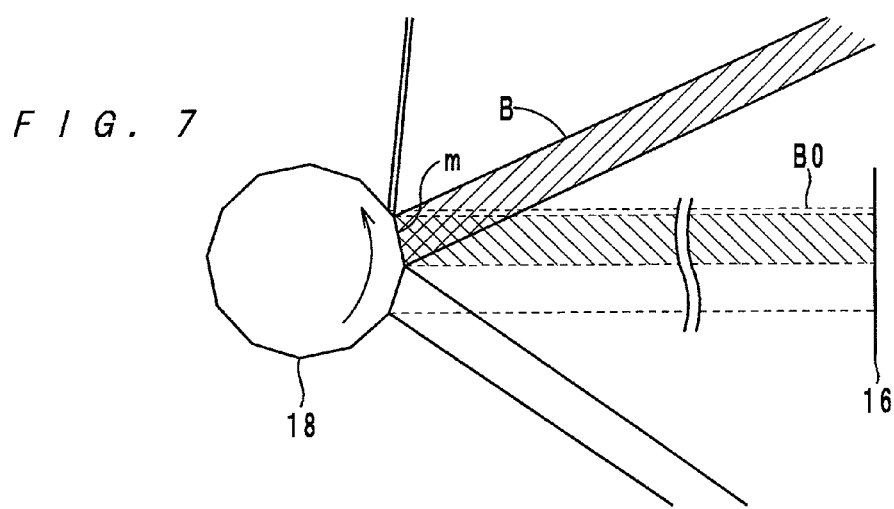
FIG. 7 is an illustration of the deflector and the beam B.

As is apparent from FIGS. 3 and 4, the optical path length of the beam B from the output surface of the free-form-surface lens 16 to the surface of the photosensitive drum 20 in the case of FIG. 3 is longer than the optical path length of the beam B from the output surface of the free-form-surface lens 16 to the surface of the photosensitive drum 20 in the case of FIG. 4. Thus, in the optical scanning device 10, the optical path length of the beam B from the output surface of the free-form-surface lens 16 to the surface of the photosensitive drum 20 depends on what point of the photosensitive drum 20 is irradiated with the beam B. The optical scanning device 10, therefore, has such a structure to permit the beam B to be focused onto the surface of the photosensitive drum 20 at all times even though the optical path length of the beam B from the output surface of the free-form-surface lens 16 to the surface of the photosensitive drum 20 varies. The structure is hereinafter described with reference to the accompanying drawings. FIGS. 5 to 7 show the deflector 18 and the beam B. FIG. 5 shows the state where the beam B is directed to the negative edge in y direction of the photosensitive drum 20. FIG. 7 shows the state where the beam B is directed to the positive edge in y direction of the photosensitive drum 20. FIG. 6 shows the state where the beam B is directed to the center in y direction of the photosensitive drum 20.

In FIGS. 5 to 7, the beam that has passed through the free-form-surface lens 16 is denoted by B0. In the beam B0, a beam that enters into a specified reflecting surface m of the polygon mirror of the deflector 18 and that is reflected from the reflecting surface m is denoted by B.

As shown by FIGS. 5 to 7, the beam B0 that has passed through the optical system 17 enters into adjacent three reflecting surfaces at all times during scanning of the photosensitive drum 20. In this embodiment, during scanning of the photosensitive drum 20, the beam B0 enters into the specified reflecting surface m over the entire width in the main-scanning direction. The beam B reflected from the reflecting surface m is scanned on the photosensitive drum 20 in y direction. Beams reflected by reflecting surfaces other than the reflecting surface m are blocked by a light-blocking member.

Since the beam B0 enters into a plurality of reflecting surfaces, a part of the beam B0 that passed through any of various portions of the free-form-surface lens 16 can become the beam B. More specifically, when the beam B is directed to the negative edge in y direction of the photosensitive drum 20, the beam B is the part of the beam B0 that passed through the lower portion (seen in FIG. 5) of the free-form-surface lens 16. As shown by FIG. 6, when the beam B is directed to the center in y direction of the photosensitive drum 20, the beam B is the part of the beam B0 that passed through the middle portion of the free-form-surface lens 16. As shown by FIG. 7, when the beam B is directed to the positive edge in y direction of the photosensitive drum 20, the beam B is the part of the beam B0 that passed through the upper portion of the free-form-surface lens 16.

In the optical scanning device 10, the optical system 17 composed of the collimator lens 14 and the free-form-surface lens 16 generates different spherical aberrations in the beam B in accordance with what portion of the optical system 17 the beam B passes through. In other words, the optical system 17 has such optical characteristics as to permit the length between the optical system 17 and the image point of the beam B to change in accordance with what portion of the optical system 17 the beam B passes through. More specifically, the optical system has such optical characteristics that the average wavefront curvature of the beam B when the beam B is directed to the negative and positive edges in y direction of the photosensitive drum 20 will be smaller than the average wavefront curvature of the beam B when the beam B is directed to the center in y direction of the photosensitive drum 20. Thereby, when the beam B is directed to the both edges in y direction of the photosensitive drum 20, the beam B is focused on a point relatively far from the optical system 17, and when the beam B is directed to the center in y direction of the photosensitive drum 20, the beam B is focused on a point relatively close to the optical system 17.

As described above, in the optical scanning system 10, since the beam B0 enters into a plurality of reflecting surfaces of the polygon mirror, a part of the beam B0 that passed through any of various portions of the free-form-surface lens 16 can become the beam B. Also, the optical system 17 including the free-form-surface lens 16 generates different spherical aberrations in the beam B in accordance with what portion of the optical system 17 the beam B passes through. The optical characteristics of the optical system 17 including the free-form-surface lens 16 are designed such that the beam B that is directed to the both edges in y direction of the photosensitive drum 20 can be focused on a point relatively far from the optical system 17 and that the beam B that is directed to the center in y direction of the photosensitive drum 20 can be focused on a point relatively close to the optical system 17. Thus, it is possible to focus the beam B onto every point of the entire surface of the photosensitive drum 20.

In the optical scanning device 10, it is not necessary to use a polygon mirror with curved reflecting surfaces as used in the optical scanning device disclosed by Japanese Patent Laid-Open Publication No. 5-241094. Accordingly, the optical scanning device 10 is less costly to manufacture.

First Example

A first example of the optical scanning device 10, which is an example according to the first embodiment, will be described below. In the first example of the optical scanning device 10, the beam B0 emitted from the light source 12 has a wavelength of 780 nm. The glass of the collimator lens 14 has a refractive index of 1.564, and the resin of the free-form-surface lens 16 has a refractive index of 1.525. The polygon mirror of the deflector 18 is in the shape of a dodecagon having an inscribed circle with a diameter of 10 mm. The deflection angle changes within the range from −25 degrees to 25 degrees. Table 1 shows the positional relationship among the collimator lens 14, the free-form-surface lens 16, the polygon mirror of the deflector 18 and the photoreceptor surface (the surface of the photosensitive drum 20).

TABLE 1

| Surface Number | Name of Component | Position of Origin of Local Coordinate System | | | X-axis Vector in Local Coordinate System | | | Y-axis Vector in Local Coordinate System | | |
|---|---|---|---|---|---|---|---|---|---|---|
| | | x | y | z | x | y | z | x | y | z |
| 1 | Collimator Lens | 119.09 | 0.00 | 10.42 | −0.9962 | 0.0000 | −0.0872 | 0.0000 | −1.0000 | 0.0000 |
| 2 | | 116.10 | 0.00 | 10.16 | −0.9962 | 0.0000 | −0.0872 | 0.0000 | −1.0000 | 0.0000 |
| 3 | Free-form-surface Lens | 99.24 | 0.00 | 8.68 | −0.9962 | 0.0000 | −0.0872 | 0.0000 | −1.0000 | 0.0000 |
| 4 | | 94.26 | 0.00 | 8.25 | −0.9962 | 0.0000 | −0.0872 | 0.0000 | −1.0000 | 0.0000 |
| 5 | Polygon Mirror | 0.00 | 0.00 | 0.00 | −1.0000 | 0.0000 | 0.0000 | 0.0000 | −1.0000 | 0.0000 |
| 6 | Photoreceptor Surface | 245.00 | 0.00 | −22.00 | 1.0000 | 0.0000 | 0.0000 | 0.0000 | 1.0000 | 0.0000 |

Surface No. 1 denotes the surface of the collimator lens 14 closer to the light source 12. Surface No. 2 denotes the surface of the collimator lens 14 closer to the free-form-surface lens 16. Surface No. 3 denotes the surface of the free-form-surface lens 16 closer to the collimator lens 14. Surface No. 5 denotes the reflecting surface of the polygon mirror that reflects the beam B0 at a deflection angle θ of 0 degrees. Surface No. 6 denotes the photoreceptor surface (the surface of the photosensitive drum 20). The surfaces 1 to 6 are expressed in respective peculiar coordinate systems, and table 1 shows the positions of the origins of the coordinate systems.

Surface No. 1 is a spherical surface and has a curvature of $4.33126 \times 10^{-3}$.

Surface No. 2 is an axisymmetric aspherical surface and has a curvature of $-6.68860 \times 10^{-2}$. The shape of Surface No. 2 is expressed by the following expression (1), and the coefficients are shown by Table 2.

$$x = \frac{c(y^2 + z^2)}{1 + \sqrt{1 - c^2(y^2 + z^2)}} + \sum_{i=0}^{12} a_i (\sqrt{y^2 + z^2})^i \quad (1)$$

TABLE 2

| Degree | Coefficient |
|---|---|
| 4 | $2.50752 \times 10^{-5}$ |
| 6 | $8.92745 \times 10^{-8}$ |
| 8 | $-2.78758 \times 10^{-10}$ |
| 10 | $2.15187 \times 10^{-11}$ |
| 12 | $-2.55070 \times 10^{-13}$ |

Surface No. 3 is a free-form surface. The shape of Surface No. 3 is expressed by the following expression (2), and the coefficients are shown by Table 3.

$$x = \sum_{i=0}^{8} \sum_{j=0}^{4} a_{ij} y^i z^j \quad (2)$$

TABLE 3

| i | j=0 | j=2 | j=4 |
|---|---|---|---|
| 0 | $0.00000 \times 10^{-0}$ | $2.54807 \times 10^{-3}$ | $7.86216 \times 10^{-5}$ |
| 2 | $2.73998 \times 10^{-3}$ | $1.28140 \times 10^{-4}$ | $-9.35916 \times 10^{-5}$ |
| 4 | $-2.39846 \times 10^{-5}$ | $-1.76113 \times 10^{-5}$ | $1.52241 \times 10^{-5}$ |
| 6 | $3.10874 \times 10^{-6}$ | $3.81174 \times 10^{-7}$ | $-1.01763 \times 10^{-6}$ |
| 8 | $-1.63496 \times 10^{-7}$ | $0.00000 \times 10^{-0}$ | $0.00000 \times 10^{-0}$ |

All coefficients except for the coefficients shown in Tables 1 to 3 are 0.

Surface No. 3 is a free-form surface expressed by an expression in which y and z are of degrees of even numbers. Therefore, surface No. 3 is a free-form surface that is symmetric about y axis and z axis.

Computer simulations were performed on the first example of the optical scanning device 10. Also, an optical scanning device of the same structure as the first example of the optical scanning device 10 except for the point that the optical system 17 is replaced with an axisymmetric converging optical system that generates no aberrations on the axis was used as a first comparative example. In the first comparative example, the beam B after passing through the converging optical system is focused on a point 260 mm distant from the polygon mirror.

Figure 8:
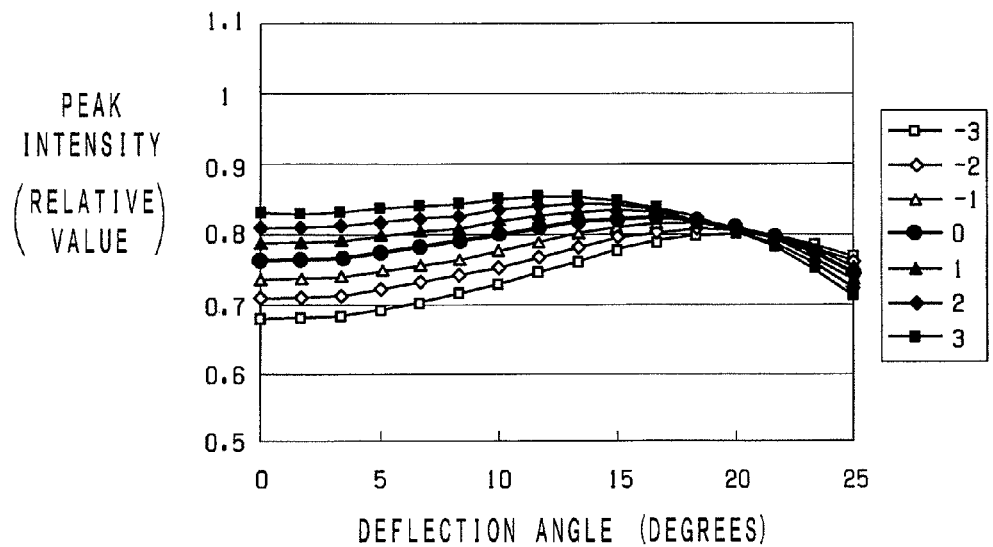
FIG. 8 is a graph showing results of a first computer simulation performed on a first example of an optical scanning device.
Figure 9:
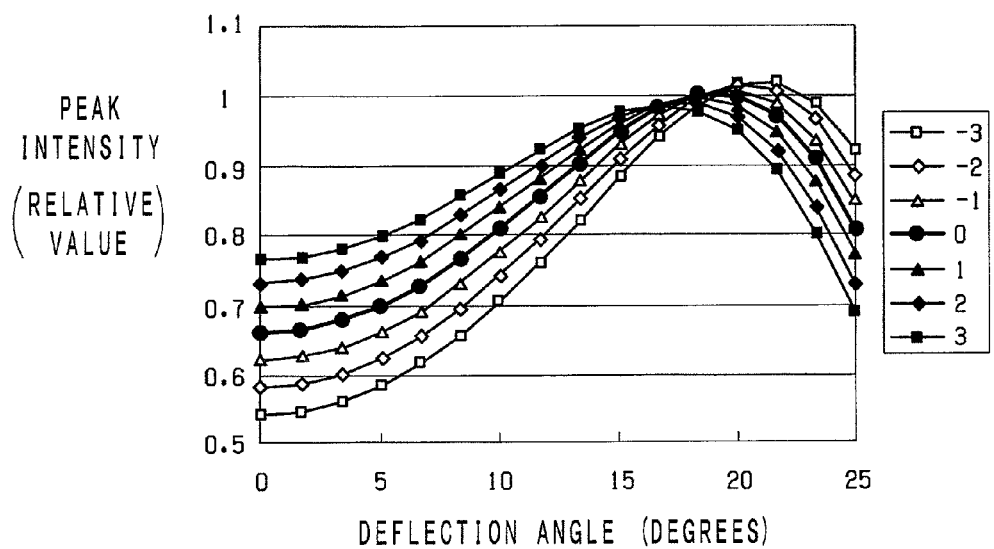
FIG. 9 is a graph showing results of the first computer simulation performed on a first comparative example.

As a first computer simulation, changes in the beam peak intensity (beam profile intensity) on the photoreceptor surface (the surface of the photosensitive drum 20) with changes in the deflection angle θ were simulated, and this simulation was performed on the first example of the optical scanning device 10 and the first comparative example. Considering defocus possibly caused by changes in temperature, the simulation was conducted while the photoreceptor surface (the photosensitive drum 20) was moved in x direction in steps of 1 mm within the range from −3 mm to 3 mm. FIG. 8 is a graph showing results of the first computer simulation performed on the first example of the optical scanning device 10. FIG. 9 is a graph showing results of the first computer simulation performed on the comparative example. The peak intensity is represented by values calculated by assuming the beam spot intensity with no aberrations as 1. FIGS. 8 and 9 show changes in the peak intensity with changes in the deflection angle θ only within the range from 0 degrees to 25 degrees. This is because changes in the peak intensity with changes in the deflection angle θ within the range from −25 degrees to 0 degrees are the same as the changes in the peak intensity with changes in the deflection angle θ within the range from 0 degrees to 25 degrees.

In the first comparative example, as is apparent from the graph of FIG. 9, the peak intensity largely changes with changes in the deflection angle θ. This shows that in an optical scanning device using an axisymmetric converging optical system that generates no aberrations on the axis, there exists a deflection angle θ that makes the convergence of the beam B very bad. In the first example of the optical scanning device 10, on the other hand, as shown by FIG. 8, the peak intensity does not change so largely even with changes in the deflection angle θ. This shows that by using the optical system 17 including the free-form-surface lens 16, degradation in the convergence of the beam B with changes in the deflection angle θ can be suppressed.

Figure 10:
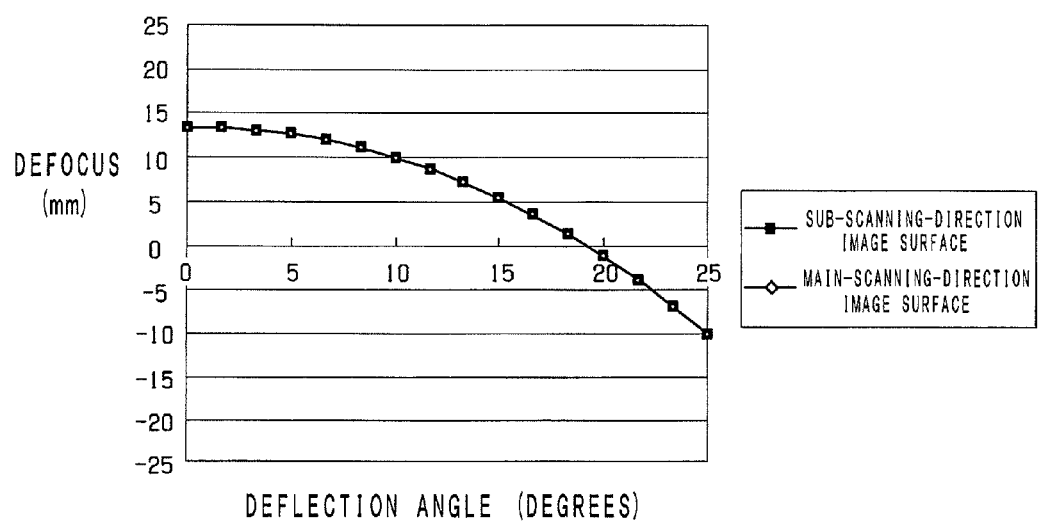
FIG. 10 is a graph showing results of a second computer simulation performed on the first comparative example.
Figure 11:
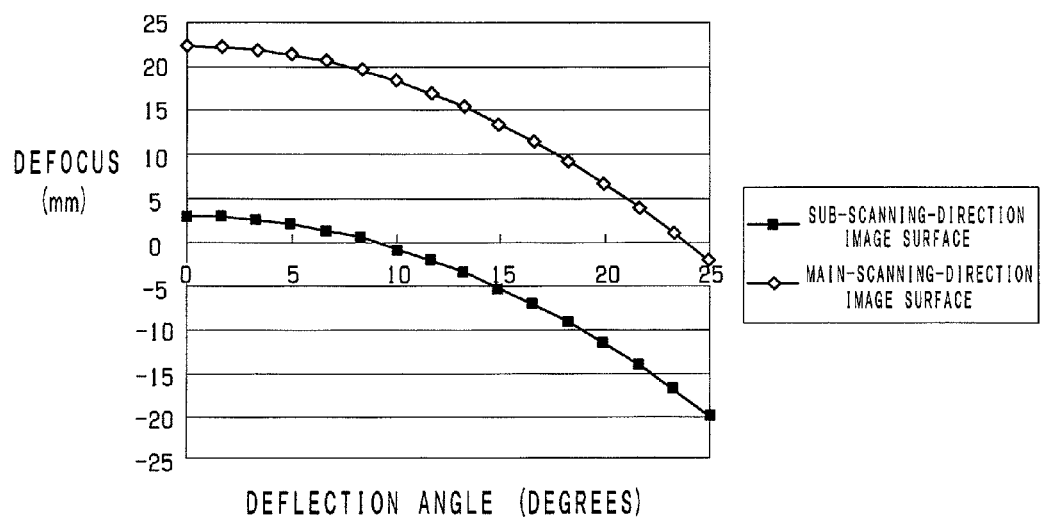
FIG. 11 is a graph showing results of the second computer simulation performed on the first example of the optical scanning device.
Figure 12:
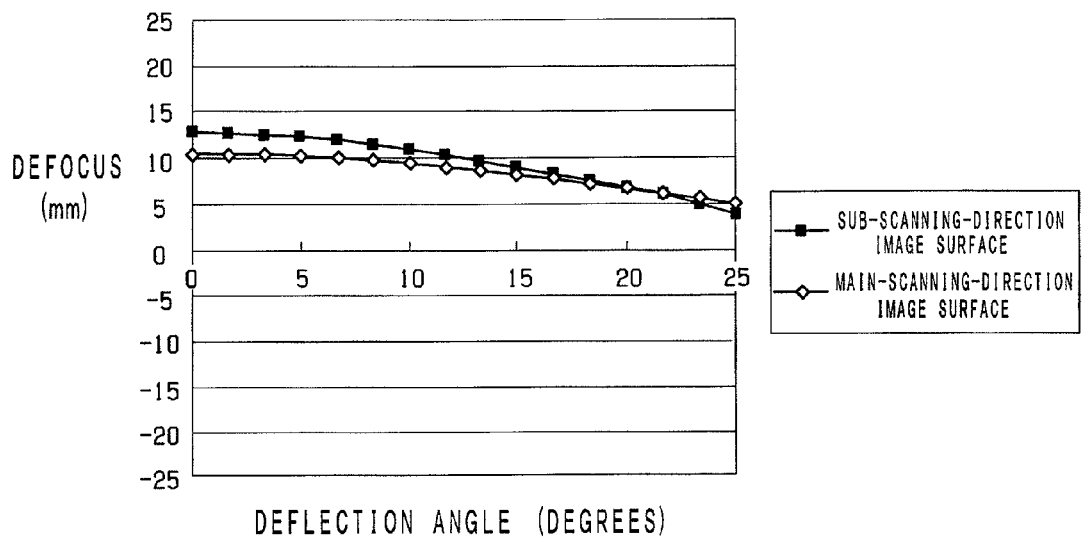
FIG. 12 is a graph showing results of the second computer simulation performed on the first example of the optical scanning device.

Next, as a second computer simulation, changes in the defocus on the photoreceptor surface (the surface of the photosensitive drum 20) with changes in the deflection angle θ (field curvature) were simulated, and this simulation was performed on the first example of the optical scanning device 10 and the first comparative example. The defocus is represented by values showing the distances by which the photoreceptor surface (the photosensitive drum 20) was moved in x direction so that the beam B could be focused onto the photoreceptor surface. With respect to the first example of the optical scanning device 10, the field curvature made by near-principal rays and the average field curvature made by the whole rays of the beam B were calculated. The principal ray means the center ray of the beam B after reflected by the polygon mirror to be used for image writing. FIG. 10 shows results of the second computer simulation performed on the first comparative example. FIGS. 11 and 12 show results of the second computer simulation performed on the first example of the optical scanning device 10. FIG. 11 shows the image surface of the near-principal rays, and FIG. 12 shows the average image surface of the whole rays of the beam B. FIGS. 11 and 12 each show the image surface of rays traveling on a surface in parallel to the main-scanning direction (which will be referred to as main-scanning-direction image surface) and the image surface of rays traveling on a surface in parallel to the sub-scanning direction (which will be referred to as sub-scanning-direction image surface).

In the first comparative example, as shown by FIG. 10, the curve showing the image surface falls steeply with increases in the deflection angle θ. This shows that in the first comparative example, as the irradiation point of the photosensitive drum 20 with the beam B comes closer to either edge in y direction, it is not possible to focus the beam B onto the surface of the photosensitive drum 20 without moving the photosensitive drum 20 in the negative direction along x axis.

In the first example of the optical scanning device 10, as shown by FIG. 11, both of the curves showing the main-scanning-direction image surface and the sub-scanning-direction image surface of the near-principal rays fall steeply with increases in the deflection angle θ, which is similar to the case of the comparative example. When a notice is taken to a particular part of the beam B (the near-principal rays), in the first example of the optical scanning device 10 also, as the irradiation point of the photosensitive drum 20 with the beam B comes closer to either edge in y direction, the beam B cannot be focused onto the surface of the photosensitive drum 20 unless the photosensitive drum 20 is moved in the negative direction along x axis.

In the first example of the optical scanning device 10, as shown by FIG. 12, however, both of the curves showing the average main-scanning-direction image surface and the average sub-scanning-direction image surface of the whole rays of the beam B do not fall so steeply even with increases in the deflection angle θ. In the first example of the optical scanning device 10, the photosensitive drum 20 is scanned with not only the near-principal rays of the beam B but also the whole rays of the beam B. The portion of the optical system 17 where the beam B passes depends on the deflection angle θ. Further, since the free-form-surface lens 16 is used in the optical system 17, the aberrations generated in the beam B depend on the portion of the optical system 17 where the beam B passes. As a result, as shown by FIG. 12, the average main-scanning-direction image surface and the average sub-scanning-direction image surface of the whole rays of the beam B do not show so steep field curvatures. This shows that in the first example of the optical scanning device 10, it is possible to focus the beam B onto every point of the entire surface of the photosensitive drum 20 without moving the photosensitive drum 20 in x direction.

As is apparent from the graphs of FIGS. 8, 12, 9 and 10, the defocus and the peak intensity are not linked to each other in the first example of the optical scanning device 10, while the defocus and the peak intensity are linked to each other in the first comparative example. This is because that in the first example of the optical scanning device 10, the aberrations depend on the deflection angle θ. It is inferred that as a result of a combination of the tendency that the peak intensity becomes greater with decreases in the defocus (as shown by FIG. 12) and the tendency that the peak intensity becomes lower with increases in the aberrations, the peak intensity characteristic shown by FIG. 8 was obtained.

Next, as a third computer simulation, changes in the vertical-line contrast and changes in the horizontal-line contrast with changes in the deflection angle θ were simulated, and the third simulation was performed on the first example of the optical scanning device 10 and the first comparative example. Specifically, in each of the first example of the optical scanning device 10 and the comparative example, a vertical-line test pattern including vertical lines with two-dot widths at intervals of two-dot widths and a horizontal-line test pattern including horizontal lines with two-dot widths at intervals of two-dot widths were formed at every of various deflection angles θ, and the contrasts of the vertical-line test pattern and the horizontal-line test pattern were calculated.

Figure 13:
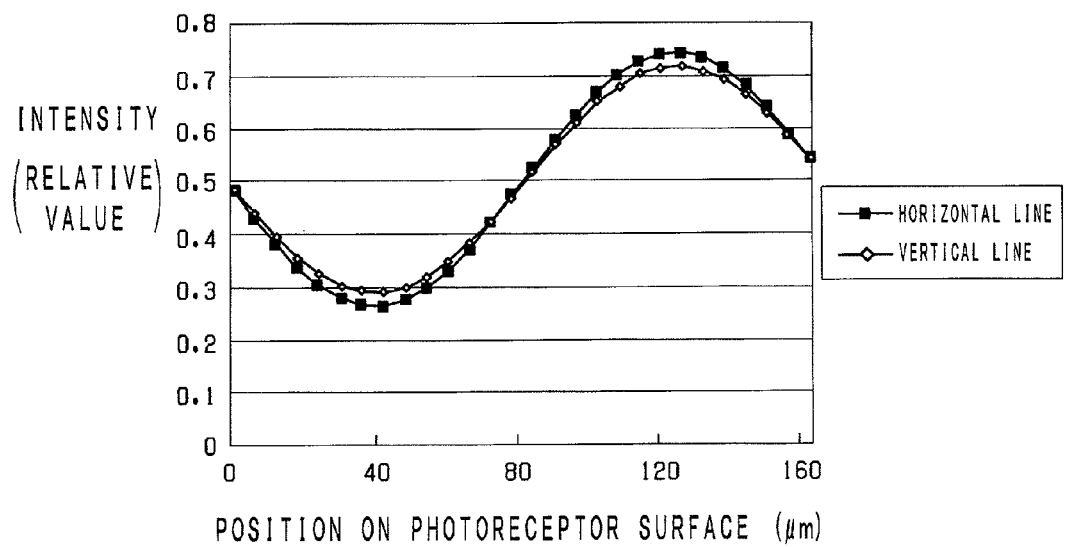
FIG. 13 is a graph showing the intensity distribution on a photoreceptor surface when a test pattern was formed by the first example of the optical scanning device.

FIG. 13 shows results of the third computer simulation performed on the first example of the optical scanning device 10, and the graph of FIG. 13 shows the intensity distribution on the photoreceptor surface (the surface of the photosensitive drum 20) when the test patterns were formed at a deflection angle θ of 25 degrees. The vertical axis of the graph shows the light intensity, and the horizontal axis of the graph shows the position on the photoreceptor surface (the surface of the photosensitive drum 20).

In FIG. 13, the light intensity is represented by values obtained by assuming the light intensity of a solid image as 1. The graph of FIG. 13 is a sinusoidal wave centering on 0.5. In the third computer simulation, the difference between the maximum value and the minimum value is calculated as a contrast. The vertical-line contrast and the horizontal-line contrast at the deflection angle θ of 25 degrees were 0.42 and 0.47, respectively.

Although not shown, similar graphs to the graph of FIG. 13 were drawn to show the intensity distributions on the photoreceptor at other deflection angles θ. Then, in a manner similar to the manner of calculating the vertical-line contrast and the horizontal-line contrast at the deflection angle θ of 25 degrees, the vertical-line contrasts and the horizontal-line contrasts at the other deflection angles θ were calculated. Also, with respect to the comparative example, the same calculations were conducted. Further, considering defocus caused by changes in temperature, the simulation was conducted while the photoreceptor surface (the photosensitive drum 20) was moved in x direction in steps of 1 mm within the range from −3 mm to 3 mm.

Figure 14:
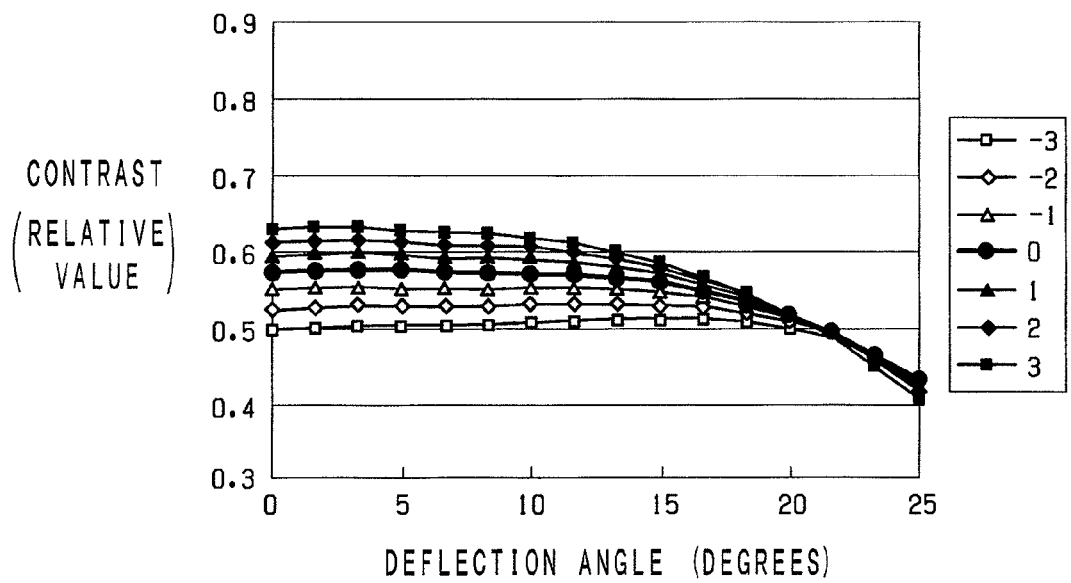
FIG. 14 is a graph showing the relationship between vertical-line contrast and deflection angle $\theta$ in the first example of the optical scanning device.
Figure 15:
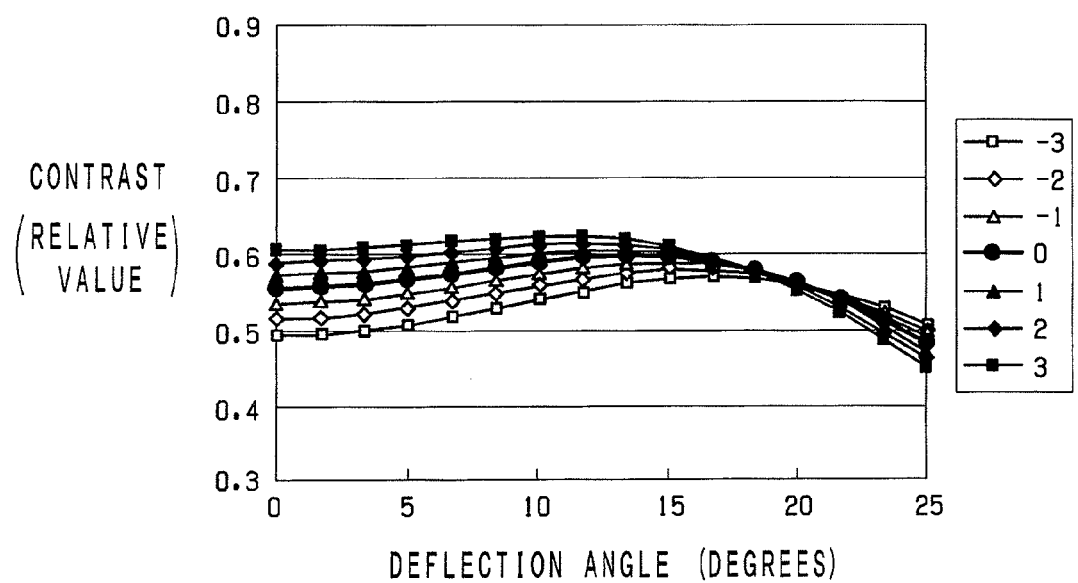
FIG. 15 is a graph showing the relationship between horizontal-line contrast and deflection angle $\theta$ in the first example of the optical scanning device.

FIG. 14 is a graph showing the relationship between the vertical-line contrast and the deflection angle θ in the first example of the optical scanning device 10. FIG. 15 is a graph showing the relationship between the horizontal-line contrast and the deflection angle θ in the first example of the optical scanning device 10. FIG. 16 is a graph showing the relationship between the vertical-line contrast and the deflection angle θ in the first comparative example. FIG. 17 is a graph showing the relationship between the horizontal-line contrast and the deflection angle θ in the first comparative example.

As is apparent from FIGS. 14 to 17, the vertical-line contrast and the horizontal-line contrast are less changeable with changes in the deflection angle θ in the first example of the optical scanning device 10 than those in the first comparative example. Moreover, the vertical-line contrast and the horizontal-line contrast are less changeable with changes in position of the photoreceptor surface (the photosensitive drum 20) in the first example of the optical scanning device 10 than those in the first comparative example. Thus, the first example of the optical scanning device 10 has not only the advantage as shown by FIG. 8 that the peak intensity is less changeable with changes in the deflection angle θ but also the advantage as shown by FIGS. 14 and 15 that the vertical-line contrast and the horizontal-line contrast are less changeable with changes in the deflection angle θ. In the first example of the optical scanning device 10, since the vertical-line contrast and the horizontal-line contrast are less changeable with changes in the deflection angle θ, it is possible to write vertical lines and horizontal lines of high picture quality.

Figure 18:
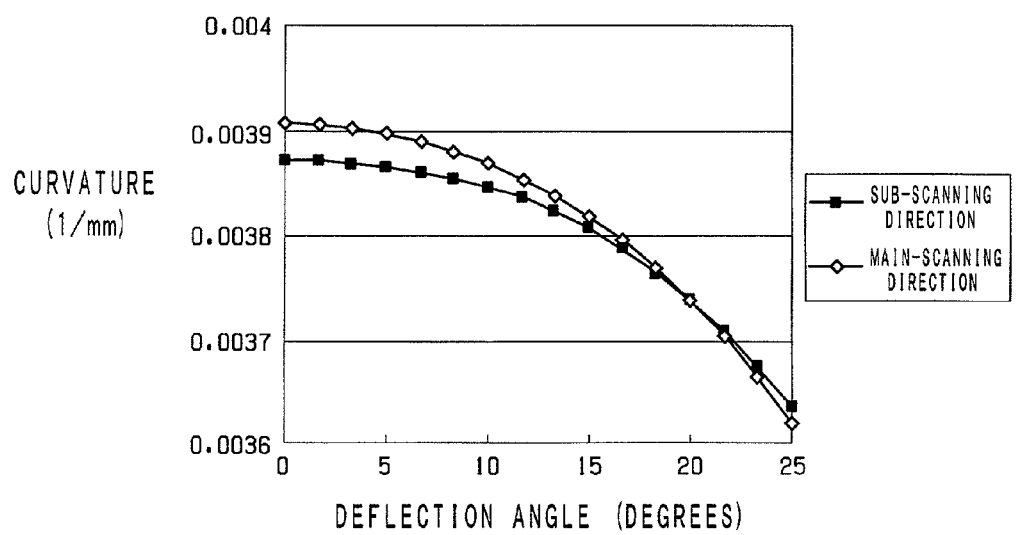
FIG. 18 is a graph showing results of a fourth computer simulation performed on the first example of the optical scanning device.
Figure 19:
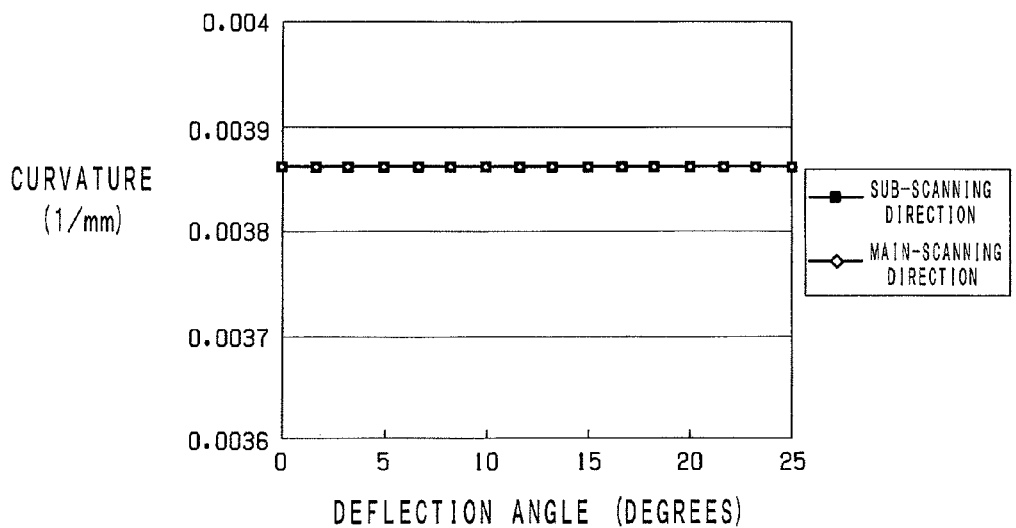
FIG. 19 is a graph showing results of the fourth computer simulation performed on the first comparative example.

Next, as a fourth computer simulation, changes in the average wavefront curvature of the beam B with changes in the deflection angle θ were simulated, and the fourth simulation was performed on the first example of the optical scanning device 10 and the first comparative example. Specifically, in each of the first example of the optical scanning device 10 and the first comparative example, the average wavefront curvature of the beam B incident to the reflecting surface m of the polygon mirror of the deflector 18 for every of various deflection angles θ was calculated. FIG. 18 is a graph showing results of the fourth computer simulation performed on the first example of the optical scanning device 10. FIG. 19 is a graph showing results of the fourth computer simulation performed on the first comparative example. In FIGS. 18 and 19, the vertical axes show the curvature, and the horizontal axes show the deflection angle θ.

As shown by FIG. 19, in the first comparative example, the average wavefront curvature of the beam B is constant. The average wavefront curvature of the beam B is a reciprocal of the distance between the optical system and the image point of the beam B. Therefore, FIG. 19 shows that in the first comparative example, it is impossible to focus the beam B onto every point of the entire photoreceptor surface (the entire surface of the photosensitive drum 20).

In the first example of the optical scanning device 10, on the other hand, as shown by FIG. 18, both of the average wavefront curvature in the main-scanning direction and the average wavefront curvature in the sub-scanning direction of the beam B become smaller with increases in the deflection angle θ. This means that the beam B is focused on a farther point from the optical system 17 as the deflection angle θ becomes greater. Meanwhile, the distance between the optical system 17 and the photoreceptor surface (the surface of the photosensitive drum 20) becomes greater as the deflection angle θ becomes greater. Therefore, in the first example of the optical scanning device 10, it is possible to focus the beam B onto every point of the entire photoreceptor surface (the surface of the photosensitive drum 20). Thus, the first example of the optical scanning device 10 can achieve better image writing performance than the first comparative example.

Second Example

Next, a second example of the optical scanning device 10, which is an example according to the first embodiment, will be described below. In the second example of the optical scanning device 10, the beam B0 emitted from the light source 12 has a wavelength of 780 nm. The glass of the collimator lens 14 has a refractive index of 1.564, and the resin of the free-form-surface lens 16 has a refractive index of 1.525. The polygon mirror of the deflector 18 is in the shape of an icosagon having an inscribed circle with a diameter of 30 mm. The deflection angle changes within the range from −15 degrees to 15 degrees. Table 4 shows the positional relationship among the collimator lens 14, the free-form-surface lens 16, the polygon mirror of the deflector 18 and the photoreceptor surface (the surface of the photosensitive drum 20).

TABLE 4

| Surface Number | Name of Component | Position of Origin of Local Coordinate System | | | X-axis Vector in Local Coordinate System | | | Y-axis Vector in Local Coordinate System | | |
|---|---|---|---|---|---|---|---|---|---|---|
| | | x | y | z | x | y | z | x | y | z |
| 1 | Collimator Lens | 119.09 | 0.00 | 10.42 | −0.9962 | 0.0000 | −0.0872 | 0.0000 | −1.0000 | 0.0000 |
| 2 | | 116.10 | 0.00 | 10.16 | −0.9962 | 0.0000 | −0.0872 | 0.0000 | −1.0000 | 0.0000 |
| 3 | Free-form-surface | 99.24 | 0.00 | 8.68 | −0.9962 | 0.0000 | −0.0872 | 0.0000 | −1.0000 | 0.0000 |
| 4 | Lens | 94.26 | 0.00 | 8.25 | −0.9962 | 0.0000 | −0.0872 | 0.0000 | −1.0000 | 0.0000 |
| 5 | Polygon Mirror | 0.00 | 0.00 | 0.00 | −1.0000 | 0.0000 | 0.0000 | 0.0000 | −1.0000 | 0.0000 |
| 6 | Photoreceptor Surface | 417.00 | 0.00 | −37.00 | 1.0000 | 0.0000 | 0.0000 | 0.0000 | 1.0000 | 0.0000 |

Surface No. 1 denotes the surface of the collimator lens 14 closer to the light source 12. Surface No. 2 denotes the surface of the collimator lens 14 closer to the free-form-surface lens 16. Surface No. 3 denotes the surface of the free-form-surface lens 16 closer to the collimator lens 14. Surface No. 5 denotes the reflecting surface of the polygon mirror that reflects the beam B0 at a deflection angle θ of 0 degrees. Surface No. 6 denotes the photoreceptor surface (the surface of the photosensitive drum 20).

Surface No. 1 is a spherical surface and has a curvature of $4.33126 \times 10^{-3}$.

Surface No. 2 is an axisymmetric aspherical surface and has a curvature of $-6.68860 \times 10^{-2}$. The shape of Surface No. 2 is expressed by the expression (1) above, and the coefficients are shown by Table 2 above.

Surface No. 3 is a free-form surface. The shape of Surface No. 3 is expressed by the expression (2) above, and the coefficients are shown by Table 5.

TABLE 5

| | j | | |
|---|---|---|---|
| I | 0 | 2 | 4 |
| 0 | $0.00000 \times 10^{-0}$ | $1.79089 \times 10^{-3}$ | $5.39396 \times 10^{-6}$ |
| 2 | $1.83964 \times 10^{-3}$ | $1.22090 \times 10^{-5}$ | $-2.82543 \times 10^{-6}$ |
| 4 | $-3.40406 \times 10^{-6}$ | $-7.47319 \times 10^{-7}$ | $1.90333 \times 10^{-7}$ |
| 6 | $1.90297 \times 10^{-7}$ | $8.25100 \times 10^{-9}$ | $-4.76290 \times 10^{-9}$ |
| 8 | $-3.91001 \times 10^{-9}$ | $0.00000 \times 10^{-0}$ | $0.00000 \times 10^{-0}$ |

All coefficients except for the coefficients shown in Tables 2, 4 and 5 are 0.

Computer simulations were performed on the second example of the optical scanning device 10. Also, an optical scanning device of the same structure as the second example of the optical scanning device 10 except for the point that the optical system 17 is replaced with an axisymmetric converging optical system that generates no aberrations on the axis was used as a second comparative example. In the second comparative example, after passing through the converging optical system, the beam B is focused on a point 424 mm distant from the polygon mirror.

Figure 20:
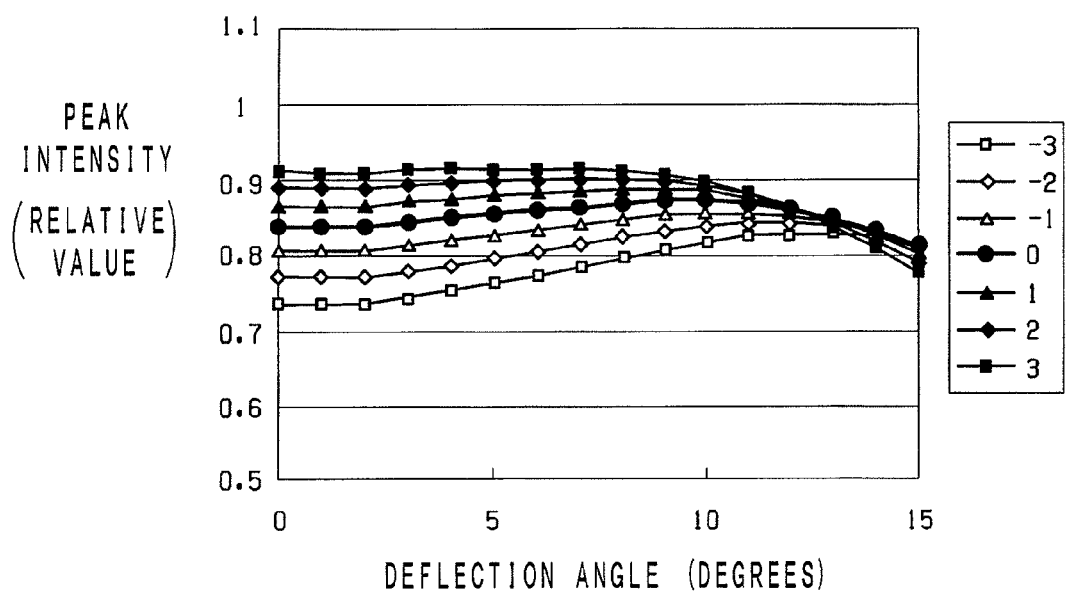
FIG. 20 is a graph showing results of the first computer simulation performed on a second example of the optical scanning device.
Figure 21:
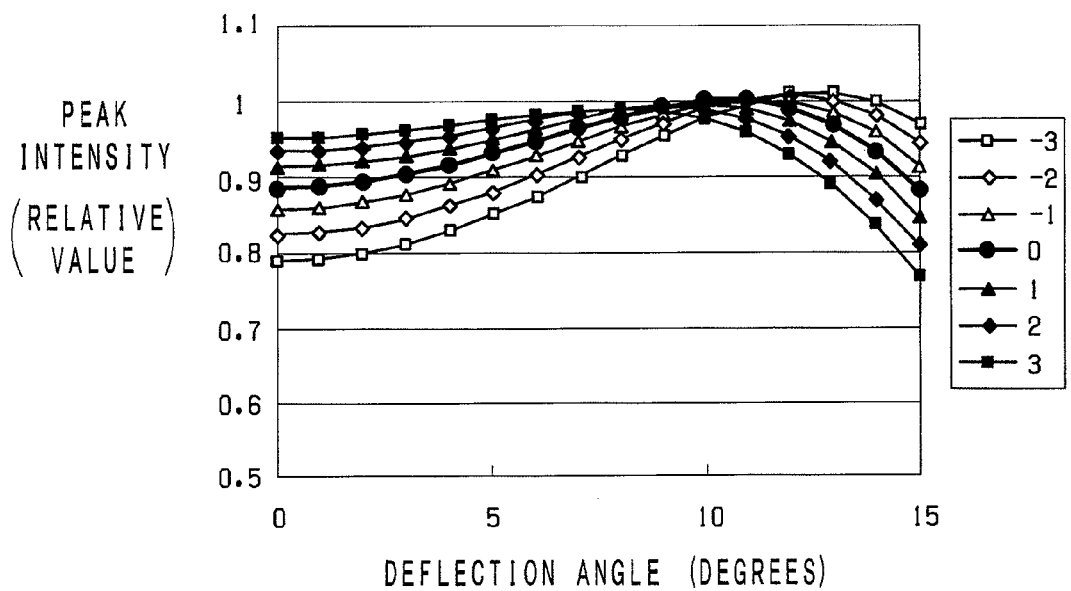
FIG. 21 is a graph showing results of the first computer simulation performed on a second comparative example.

The above-described first computer simulation was performed on the second example of the optical scanning device 10 and the second comparative example. The description of the first computer simulation is not given here. FIG. 20 is a graph showing results of the first computer simulation performed on the second example of the optical scanning device 10. FIG. 21 is a graph showing results of the first computer simulation performed on the second comparative example. FIGS. 20 and 21 show changes in the peak intensity with changes in the deflection angle θ only within the range from 0 degrees to 15 degrees. This is because changes in the peak intensity with changes in the deflection angle θ within the range from −15 degrees to 0 degrees are the same as the changes in the peak intensity with changes in the deflection angle θ within the range from 0 degrees to 15 degrees.

In the second comparative example, as is apparent from the graph of FIG. 21, the peak intensity largely changes with changes in the deflection angle θ. This shows that in an optical scanning device using an axisymmetric converging optical system that generates no aberrations on the axis, there exists a deflection angle θ that makes the convergence of the beam B very bad. In the second example of the optical scanning device 10, on the other hand, as shown by FIG. 20, the peak intensity does not change so largely even with changes in the deflection angle θ. This shows that by using the optical system 17 including the free-form-surface lens 16, degradation in the convergence of the beam B with changes in the deflection angle θ can be suppressed.

Figure 22:
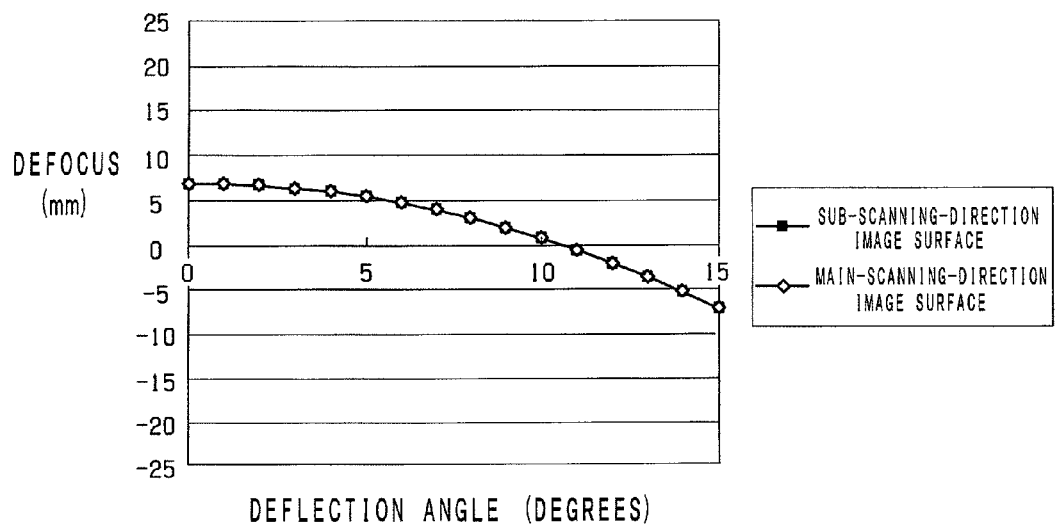
FIG. 22 is a graph showing results of the second computer simulation performed on the second comparative example.
Figure 23:
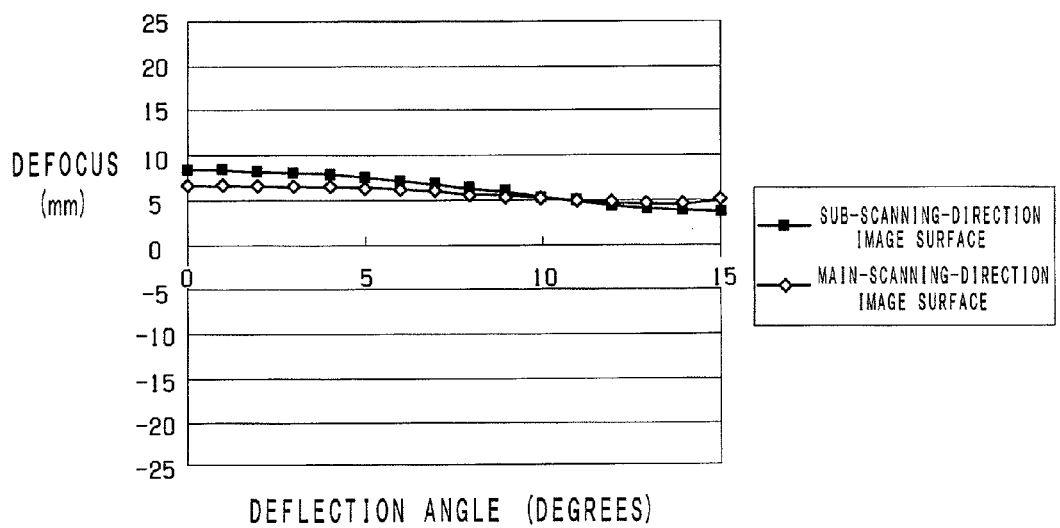
FIG. 23 is a graph showing results of the second computer simulation performed on the second example of the optical scanning device.

Next, the above-described second computer simulation was performed on the second example of the optical scanning device 10 and the second comparative example. The description of the second computer simulation is not given here. FIG. 22 is a graph showing results of the second computer simulation performed on the second comparative example. FIG. 23 is a graph showing results of the second computer simulation performed on the second example of the optical scanning device 10. FIG. 23 shows the average main-scanning-direction image surface and the average sub-scanning-direction image surface of the whole rays of the beam B.

In the second comparative example, as shown by FIG. 22, the curve showing the image surface falls steeply with increases in the deflection angle θ. This shows that in the second comparative example, as the irradiation point of the photosensitive drum 20 with the beam B comes closer to either edge in y direction, it is not possible to focus the beam B onto the surface of the photosensitive drum 20 without moving the photosensitive drum 20 in the negative direction along x axis.

In the second example of the optical scanning device 10, however, as shown by FIG. 23, both of the curves showing the average main-scanning-direction image surface and the average sub-scanning-direction image surface of the whole rays of the beam B do not fall so steeply even with increases in the deflection angle θ. In the second example of the optical scanning device 10, the portion of the optical system 17 where the beam B passes depends on the deflection angle θ. Further, since the free-form-surface lens 16 is used in the optical system 17, the aberrations generated in the beam B depend on the portion of the optical system 17 where the beam B passes. As a result, as shown by FIG. 23, the average main-scanning-direction image surface and the average sub-scanning-direction image surface of the whole rays of the beam B do not show so steep field curvatures. This shows that in the second example of the optical scanning device 10, it is possible to focus the beam B onto every point of the entire surface of the photosensitive drum 20 without moving the photosensitive drum 20 in x direction.

Figure 26:
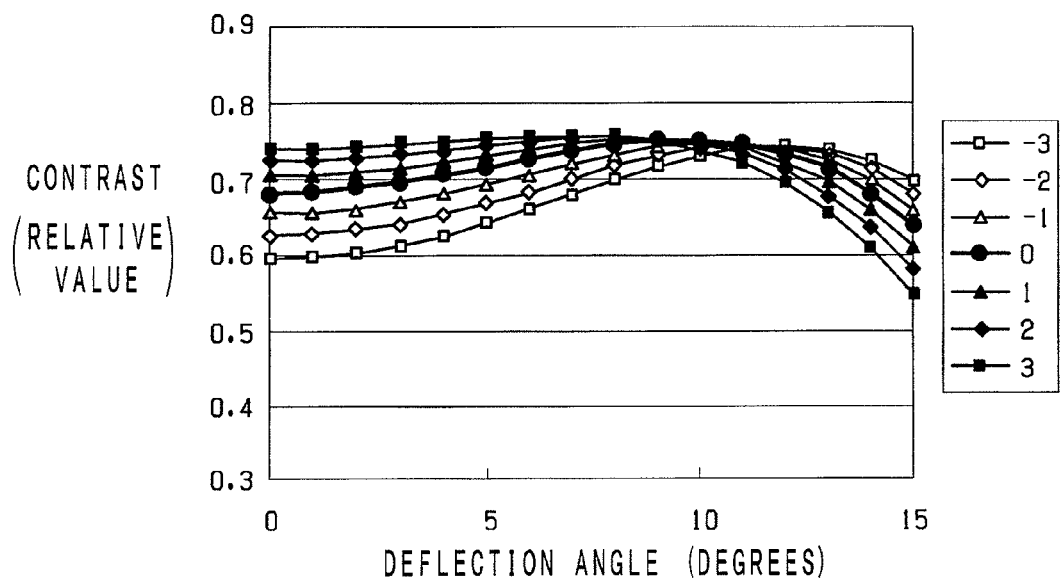
FIG. 26 is a graph showing the relationship between vertical-line contrast and deflection angle $\theta$ in the second comparative example.
Figure 27:
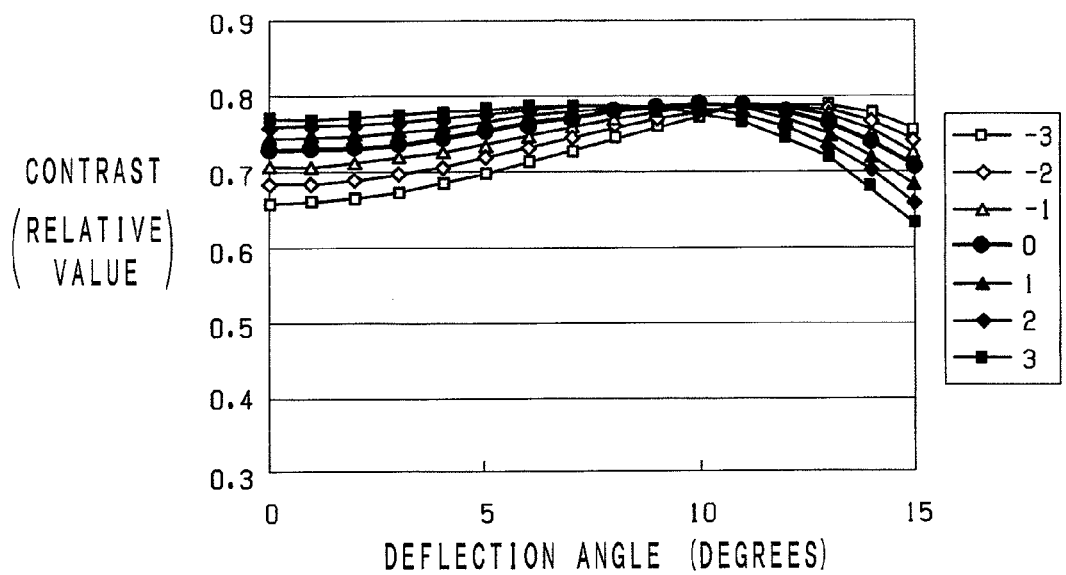
FIG. 27 is a graph showing the relationship between horizontal-line contrast and deflection angle $\theta$ in the second comparative example.

Next, the above-described third computer simulation was performed. The description of the third computer simulation is not given here. FIG. 24 is a graph showing the relationship between the vertical-line contrast and the deflection angle θ in the second example of the optical scanning device 10. FIG. 25 is a graph showing the relationship between the horizontal-line contrast and the deflection angle θ in the second example of the optical scanning device 10. FIG. 26 is a graph showing the relationship between the vertical-line contrast and the deflection angle θ in the second comparative example. FIG. 25 is a graph showing the relationship between the horizontal-line contrast and the deflection angle θ in the second comparative example.

As is apparent from FIGS. 24 to 27, the vertical-line contrast and the horizontal-line contrast are less changeable with changes in the deflection angle θ in the second example of the optical scanning device 10 than those in the second comparative example. Moreover, the vertical-line contrast and the horizontal-line contrast are less changeable with changes in position of the photoreceptor surface (the photosensitive drum 20) in the second example of the optical scanning device 10 than those in the second comparative example. Thus, the second example of the optical scanning device 10 has not only the advantage as shown by FIG. 20 that the peak intensity is less changeable with changes in the deflection angle θ but also the advantage as shown by FIGS. 24 and 25 that the vertical-line contrast and the horizontal-line contrast are less changeable with changes in the deflection angle θ. In the second example of the optical scanning device 10, since the vertical-line contrast and the horizontal-line contrast are less changeable with changes in the deflection angle θ, it is possible to write vertical lines and horizontal lines of high picture quality.

Further, it is apparent from the comparison of the graphs of FIGS. 24 and 25 with the graphs of FIGS. 14 and 15 that the vertical-line contrast and the horizontal-line contrast are less changeable with changes in the deflection angle θ in the second example of the optical scanning device 10 than those in the first example of the optical scanning device 10. This is because the deflection angle θ changes within the range from −25 degrees to 25 degrees in the first example of the optical scanning device 10, while the deflection angle θ changes within the range from −15 degrees to 15 degrees in the second example of the optical scanning device 10.

Figure 28:
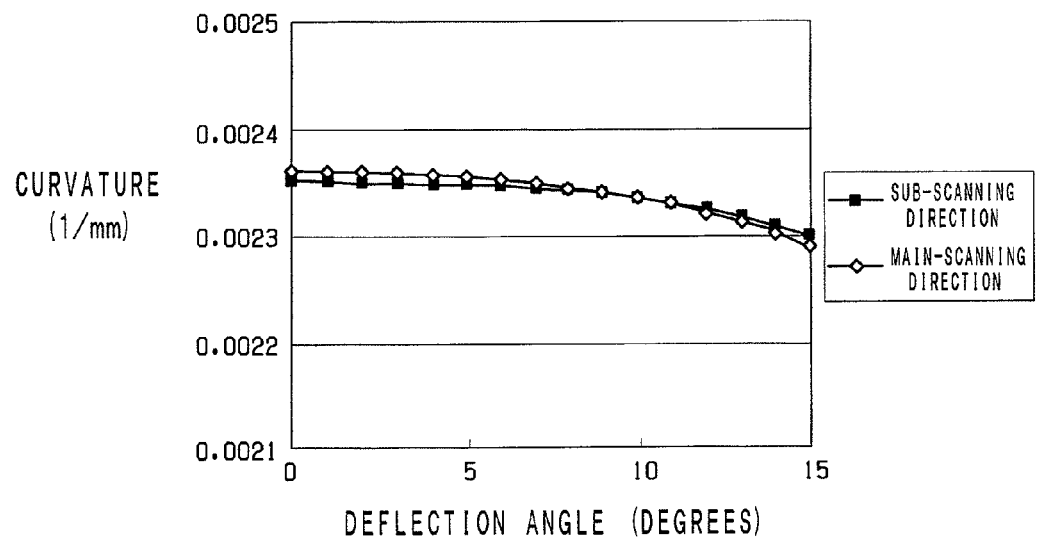
FIG. 28 is a graph showing results of the fourth computer simulation performed on the second example of the optical scanning device.
Figure 29:
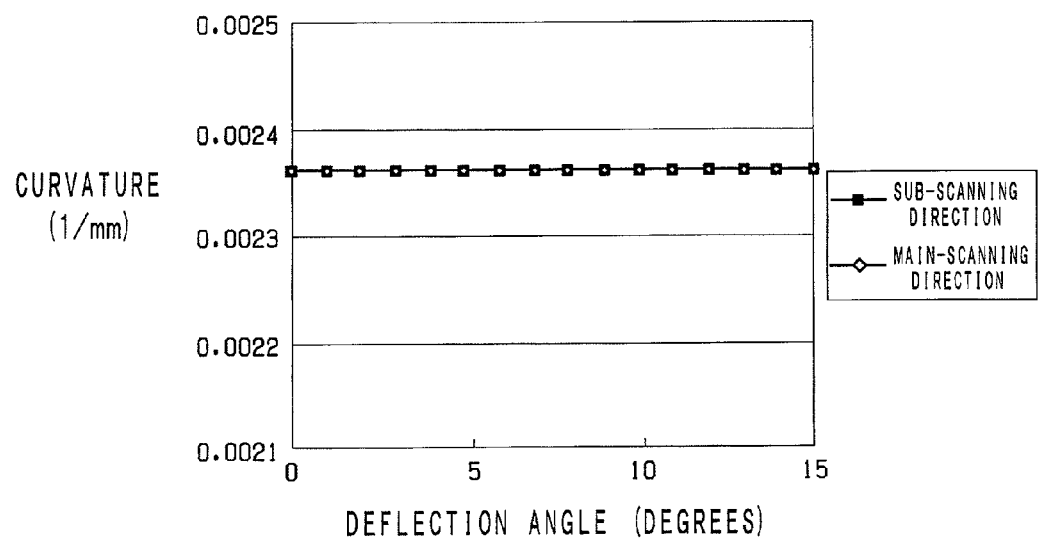
FIG. 29 is a graph showing results of the fourth computer simulation performed on the second comparative example.

Next, the above-described fourth computer simulation was performed. The description of the fourth computer simulation is not given here. FIG. 28 is a graph showing results of the fourth computer simulation performed on the second example of the optical scanning device 10. FIG. 29 is a graph showing results of the fourth computer simulation performed on the second comparative example. In FIGS. 28 and 29, the vertical axes show the curvature, and the horizontal axes show the deflection angle θ.

As shown by FIG. 29, in the second comparative example, the average wavefront curvature of the beam B is constant. The average wavefront curvature of the beam B is a reciprocal of the distance between the optical system and the image point of the beam B. Therefore, FIG. 29 shows that in the second comparative example, it is impossible to focus the beam B onto every point of the entire photoreceptor surface (the entire surface of the photosensitive drum 20).

In the second example of the optical scanning device 10, on the other hand, as shown by FIG. 28, both of the average wavefront curvature in the main-scanning direction and the average wavefront curvature in the sub-scanning direction of the beam B become smaller with increases in the deflection angle θ. This means that the beam B is focused on a farther point from the optical system 17 as the deflection angle θ becomes greater. Meanwhile, the distance between the optical system 17 and the photoreceptor surface (the surface of the photosensitive drum 20) becomes greater as the deflection angle θ becomes greater. Therefore, in the second example of the optical scanning device 10, it is possible to focus the beam B onto every point of the entire photoreceptor surface (the surface of the photosensitive drum 20). Thus, the second example of the optical scanning device 10 can achieve better image writing performance than the second comparative example.

Second Embodiment

Structure of the Optical Scanning Device

An optical scanning device 10 according to a second embodiment will be hereinafter described. The optical scanning device 10 according to the second embodiment is basically of the same structure as the optical scanning device 10 according to the first embodiment shown by FIG. 1. The difference in structure between the optical scanning device 10 according to the first embodiment and the optical scanning device 10 according to the second embodiment is that an axisymmetric aspherical lens 16' is used in the optical scanning device 10 according to the second embodiment, while the free-form-surface lens 16 is used in the optical scanning device 10 according to the first embodiment. The other components of the optical scanning device 10 according to the second embodiment are the same as those of the optical scanning device 10 according to the first embodiment, and descriptions of the components are omitted.

Next, a third example of the optical scanning device 10, which is an example according to the second embodiment, will be described below. In the third example of the optical scanning device 10, the beam B0 emitted from the light source 12 has a wavelength of 780 nm. The glass of the collimator lens 14 has a refractive index of 1.564, and the resin of the axisymmetric aspherical lens 16' has a refractive index of 1.525. The polygon mirror of the deflector 18 is in the shape of an icosagon having an inscribed circle with a diameter of 30 mm. The deflection angle changes within the range from −15 degrees to 15 degrees. Table 6 shows the positional relationship among the collimator lens 14, the axisymmetric aspherical lens 16', the polygon mirror of the deflector 18 and the photoreceptor surface (the surface of the photosensitive drum 20).

TABLE 6

| Surface Number | Name of Component | Position of Origin of Local Coordinate System | | | X-axis Vector in Local Coordinate System | | | Y-axis Vector in Local Coordinate System | | |
|---|---|---|---|---|---|---|---|---|---|---|
| | | x | y | z | x | y | z | x | y | z |
| 1 | Collimator Lens | 119.09 | 0.00 | 10.42 | −0.9962 | 0.0000 | −0.0872 | 0.0000 | −1.0000 | 0.0000 |
| 2 | | 116.10 | 0.00 | 10.16 | −0.9962 | 0.0000 | −0.0872 | 0.0000 | −1.0000 | 0.0000 |
| 3 | Axisymmetric | 99.24 | 0.00 | 8.68 | −0.9962 | 0.0000 | −0.0872 | 0.0000 | −1.0000 | 0.0000 |
| 4 | Aspherical Lens | 94.26 | 0.00 | 8.25 | −0.9962 | 0.0000 | −0.0872 | 0.0000 | −1.0000 | 0.0000 |
| 5 | Polygon Mirror | 0.00 | 0.00 | 0.00 | −1.0000 | 0.0000 | 0.0000 | 0.0000 | −1.0000 | 0.0000 |
| 6 | Photoreceptor Surface | 417.00 | 0.00 | −37.00 | 1.0000 | 0.0000 | 0.0000 | 0.0000 | 1.0000 | 0.0000 |

Surface No. 1 denotes the surface of the collimator lens 14 closer to the light source 12. Surface No. 2 denotes the surface of the collimator lens 14 closer to the axisymmetric aspherical lens 16'. Surface No. 3 denotes the surface of the axisymmetric aspherical lens 16' closer to the collimator lens 14. Surface No. 5 denotes the reflecting surface of the polygon mirror that reflects the beam B0 at a deflection angle θ of 0 degrees. Surface No. 6 denotes the photoreceptor surface (the surface of the photosensitive drum 20).

Surface No. 1 is a spherical surface and has a curvature of $4.33126 \times 10^{-3}$.

Surface No. 2 is an axisymmetric aspherical surface and has a curvature of $-6.68860 \times 10^{-2}$. The shape of Surface No. 2 is expressed by the expression (1) above, and the coefficients are shown by Table 2 above.

Surface No. 3 is an axisymmetric aspherical surface and has a curvature of $3.66937 \times 10^{-3}$. The shape of Surface No. 3 is expressed by the expression (1) above, and the coefficients are shown by Table 7.

TABLE 7

| Degree | Coefficient |
|---|---|
| 4 | $-2.27726 \times 10^{-6}$ |
| 6 | $1.36769 \times 10^{-7}$ |
| 8 | $-3.09440 \times 10^{-9}$ |

All coefficients except for the coefficients shown in Tables 6 and 7 are 0.

Computer simulations were performed on the third example of the optical scanning device 10. Here also, the optical scanning device used as the second comparative example was used for comparison. The second comparative example has been already described, and the description is not given here.

Figure 30:
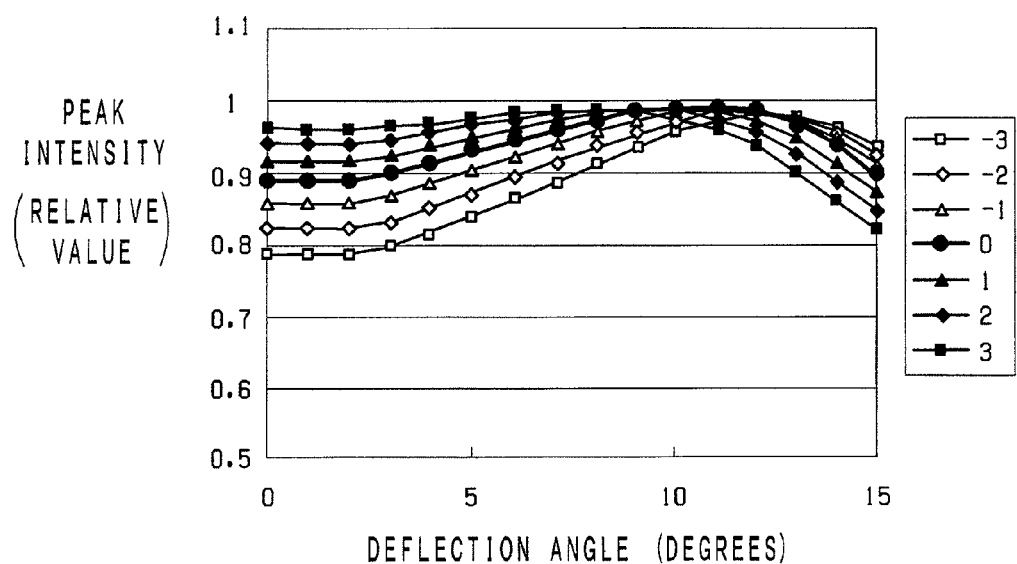
FIG. 30 is a graph showing results of the first computer simulation performed on a third example of the optical scanning device.

The above-described first computer simulation was performed. FIG. 30 is a graph showing results of the first computer simulation performed on the third example of the optical scanning device 10. The results of the first computer simulation performed on the second example are shown by FIG. 21. FIG. 30 shows changes in the peak intensity with changes in the deflection angle θ only within the range from 0 degrees to 15 degrees. This is because changes in the peak intensity with changes in the deflection angle θ within the range from −15 degrees to 0 degrees are the same as the changes in the peak intensity with changes in the deflection angle θ within the range from 0 degrees to 15 degrees.

In the second comparative example, as is apparent from the graph of FIG. 21, the peak intensity largely changes with changes in the deflection angle θ. This shows that in an optical scanning device using an axisymmetric converging optical system that generates no aberrations on the axis, there exists a deflection angle θ that makes the convergence of the beam B very bad. In the third example of the optical scanning device 10, on the other hand, as shown by FIG. 30, the peak intensity does not change so largely even with changes in the deflection angle θ. This shows that by using the optical system 17 including the axisymmetric aspherical lens 16', degradation in the convergence of the beam B with changes in the deflection angle θ can be suppressed.

Figure 31:
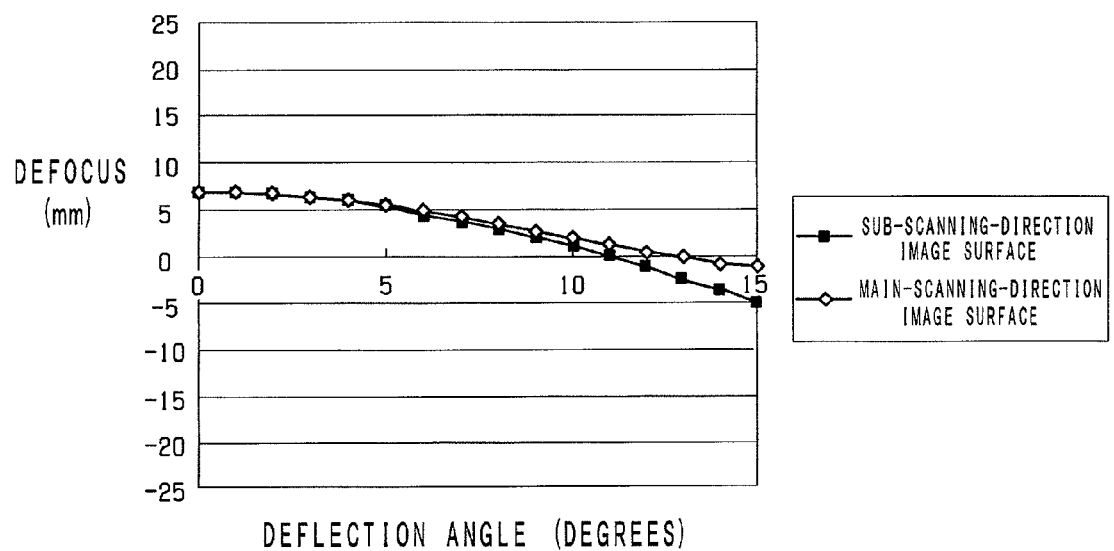
FIG. 31 is a graph showing results of the second computer simulation performed on a third example of the optical scanning device.

Next, the above-described second computer simulation was performed. The description of the second computer simulation is not given here. FIG. 31 is a graph showing results of the second computer simulation performed on the third example of the optical scanning device 10. FIG. 31 shows the average main-scanning-direction image surface and the average sub-scanning-direction image surface of the whole rays of the beam B. The results of the second computer simulation performed on the second comparative example are shown by FIG. 22.

In the second comparative example, as shown by FIG. 22, the curve showing the image surface falls steeply with increases in the deflection angle θ. This shows that in the second comparative example, as the irradiation point of the photosensitive drum 20 with the beam B comes closer to either edge in y direction, it is not possible to image the beam B on the surface of the photosensitive drum 20 without moving the photosensitive drum 20 in the negative direction along x axis.

In the third example of the optical scanning device 10, as shown by FIG. 31, the average main-scanning-direction image surface of the whole rays of the beam B does not curve so steeply even with increases in the deflection angle θ. In the third example of the optical scanning device 10, the portion of the optical system 17 where the beam B passes depends on the deflection angle θ. Further, since the axisymmetric aspherical lens 16' is used in the optical system 17, the aberrations generated in the beam B depend on the portion of the optical system 17 where the beam B passes. As a result, as shown by FIG. 31, the average main-scanning-direction image surface of the whole rays of the beam B does not curve so steeply even with increases in the deflection angle θ. This shows that in the third example of the optical scanning device 10, it is possible to focus the beam B in the main-scanning direction onto every point of the entire surface of the photosensitive drum 20 without moving the photosensitive drum 20 in x direction.

Surface No. 3 of the axisymmetric aspherical lens 16' is axisymmetric. Changes in the aberrations generated in the beam B with changes in the position in the main-scanning direction of the axisymmetric aspherical lens 16' where the beam B passes are the same as changes in the aberrations generated in the beam B with changes in the position in the sub-scanning direction of the axisymmetric aspherical lens 16' where the beam B passes. Accordingly, with the axisymmetric aspherical lens 16', it is impossible to control the main-scanning-direction image surface and the sub-scanning-direction image surface independently of each other. As shown by FIG. 31, therefore, in the third example of the optical scanning device 10, the average sub-scanning-direction image surface of the whole spot of the beam B curves steeply with increases in the deflection angle θ. This shows that in the third example of the optical scanning device 10, it is difficult to focus the beam B in the sub-scanning direction onto every point of the entire surface of the photosensitive drum 20 without moving the photosensitive drum 20 in x direction. Thus, compared with the second comparative example, the third example of the optical scanning device 10 can achieve better performance of image formation of the beam B on every point of the photosensitive drum 20. Compared with the first example and the second example of the optical scanning device 10, however, the third example of the optical scanning device 10 cannot achieve so good performance of image formation of the beam B on every point of the photosensitive drum 20. From the viewpoint of cost, however, the axisymmetric aspherical lens 16' is less expensive than the free-form-surface lens 16, and accordingly, the third example of the optical scanning device 10 is cheaper to manufacture than the first example and the second example of the optical scanning device 10.

Figure 32:
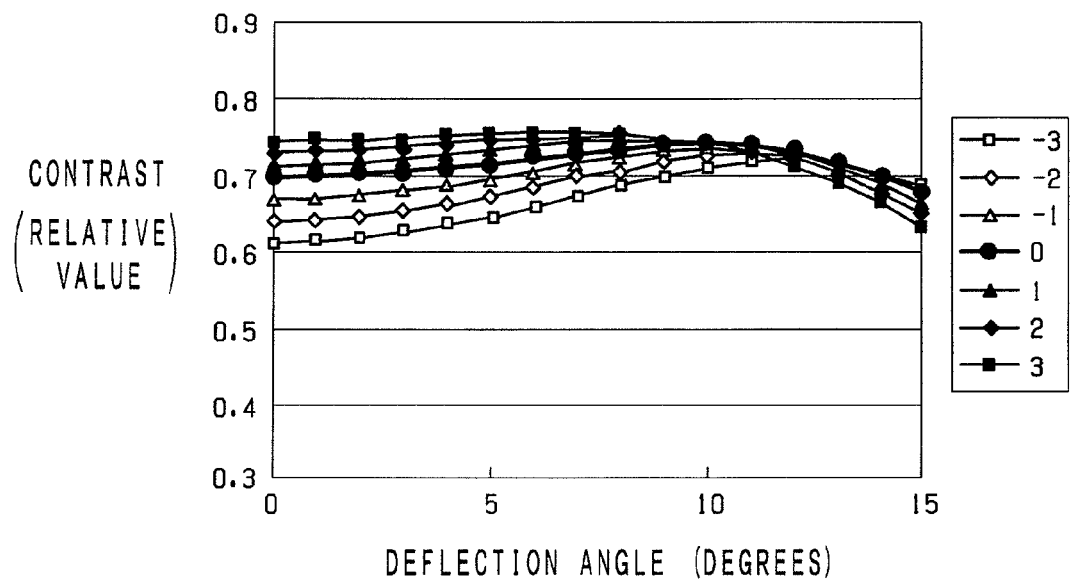
FIG. 32 is a graph showing the relationship between vertical-line contrast and deflection angle $\theta$ in the third example of the optical scanning device.
Figure 33:
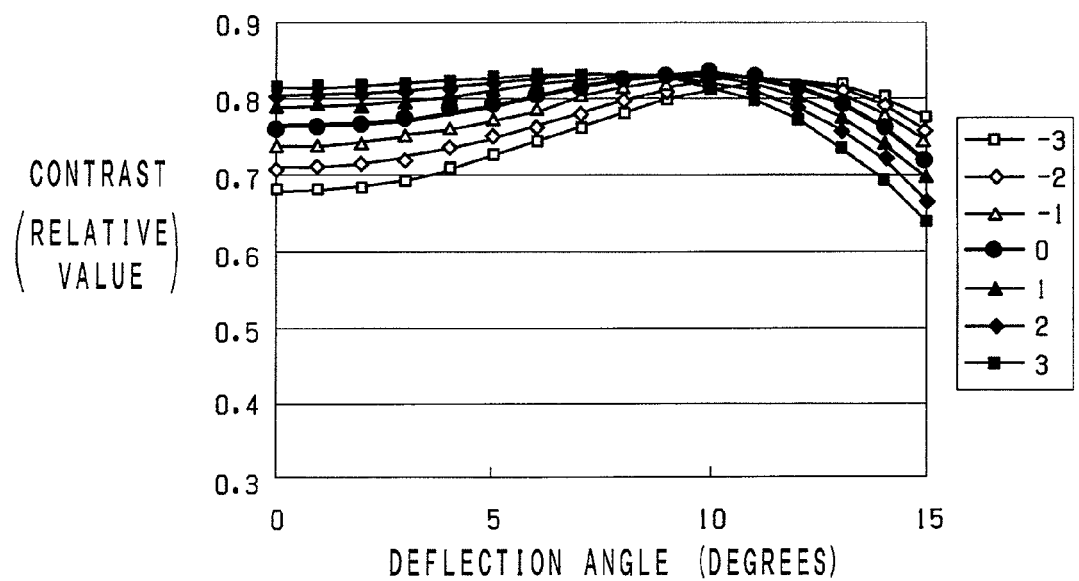
FIG. 33 is a graph showing the relationship between horizontal-line contrast and deflection angle θ in the third example of the optical scanning device.

Next, the above-described third computer simulation was performed. The description of the third computer simulation is not given here. FIG. 32 shows the relationship between the vertical-line contrast and the deflection angle θ in the third example of the optical scanning device 10. FIG. 33 shows the relationship between the horizontal-line contrast and the deflection angle θ in the third example of the optical scanning device 10.

As is apparent from FIG. 32, the vertical-line contrast in the third example of the optical scanning device 10 is less changeable with changes in the deflection angle θ than that in the second comparative example. The horizontal-line contrast in the third example of the optical scanning device 10 is, however, as changeable with changes in the deflection angle θ as that in the second comparative example. This is because the third example of the optical scanning device 10 uses the axisymmetric aspherical lens 16'. Thus, in the third example of the optical scanning device 10, since the vertical-line contrast is less changeable with changes in the deflection angle θ, it is possible to write vertical lines of high picture quality.

Figure 34:
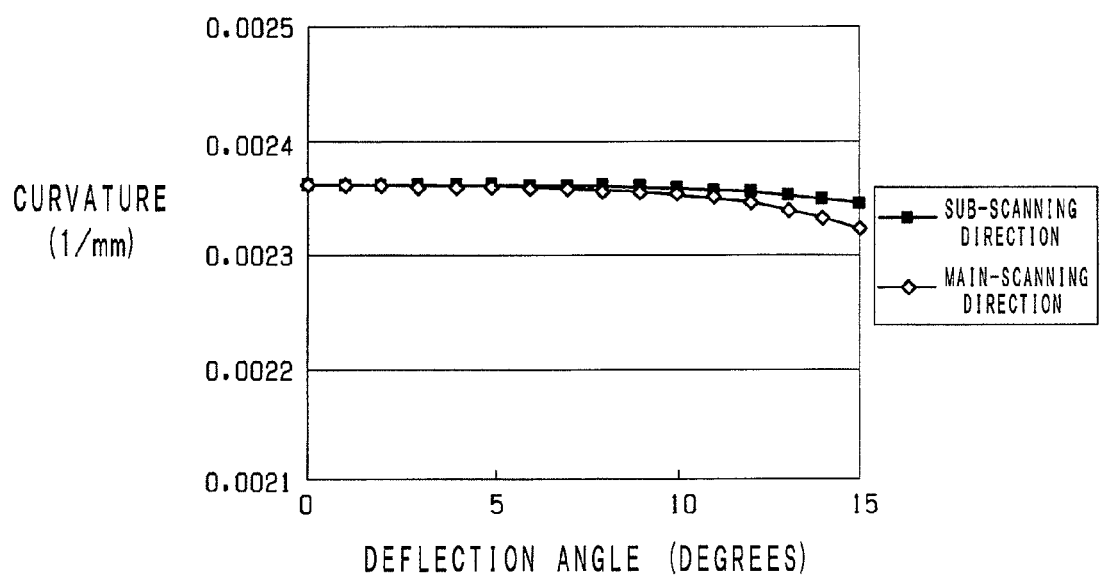
FIG. 34 is a graph showing results of the fourth computer simulation performed on the third example of the optical scanning device.

Next, the above-described fourth computer simulation was performed. The description of the fourth computer simulation is not given here. FIG. 34 shows results of the fourth computer simulation performed on the third example of the optical scanning device 10. In FIG. 34, the vertical axis shows the curvature, and the horizontal axis shows the deflection angle θ.

In the third example of the optical scanning device 10, as shown by FIG. 34, the average wavefront curvature in the main-scanning direction of the beam B becomes smaller with increases in the deflection angle θ. This means that the beam B is focused on a farther point from the optical system 17 as the deflection angle θ becomes greater. Meanwhile, the distance between the optical system 17 and the photoreceptor surface (the surface of the photosensitive drum 20) becomes greater as the deflection angle θ becomes greater. Therefore, in the third example of the optical scanning device 10, it is possible to focus the beam B onto every point of the entire photoreceptor surface (the surface of the photosensitive drum 20). Thus, the third example of the optical scanning device 10 can achieve better image writing performance than the second comparative example.

In the third example of the optical scanning device 10, the average wavefront curvature in the sub-scanning direction of the beam B does not change with changes in the deflection angle θ. This is because the third example of the optical scanning device 10 uses the axisymmetric aspherical lens 16'.

Third Embodiment

Structure of the Optical Scanning Device

An optical scanning device 10 according to a third embodiment will be hereinafter described. FIG. 35 shows the structure of the optical scanning device according to the third embodiment.

The difference in structure between the optical scanning device 10 according to the second embodiment and the optical scanning device 10 according to the third embodiment is that only the axisymmetric aspherical lens 15 is used as the optical system 17 in the optical scanning device 10 according to the third embodiment, while the collimator lens 14 and the axisymmetrical aspherical lens 16' are used as the optical system 17 in the optical scanning device 10 according to the second embodiment. Thus, in the optical scanning device 10 according to the third embodiment, the axisymmetric aspherical lens 15 serves as the collimator lens 14 and the axisymmetric aspherical lens 16'. The other components of the optical scanning device 10 according to the third embodiment are the same as those of the optical scanning device 10 according to the second embodiment, and descriptions of the components are omitted.

Fourth Example

Next, a fourth example of the optical scanning device 10, which is an example according to the second embodiment, will be described below. In the fourth example of the optical scanning device 10, the beam B0 emitted from the light source 12 has a wavelength of 780 nm. The glass of the axisymmetric aspherical lens 15 has a refractive index of 1.564. The polygon mirror of the deflector 18 is in the shape of an icosagon having an inscribed circle with a diameter of 30 mm. The deflection angle θ changes within the range from −15 degrees to 15 degrees. Table 8 shows the positional relationship among the axisymmetric aspherical lens 15, the polygon mirror of the deflector 18 and the photoreceptor surface (the surface of the photosensitive drum 20).

TABLE 8

| Surface Number | Name of Component | Position of Origin of Local Coordinate System | | | X-axis Vector in Local Coordinate System | | | Y-axis Vector in Local Coordinate System | | |
|---|---|---|---|---|---|---|---|---|---|---|
| | | x | y | z | x | y | z | x | y | z |
| 1 | Axisymmetric Aspherical Lens | 119.09 | 0.00 | 10.42 | −0.9962 | 0.0000 | −0.0872 | 0.0000 | −1.0000 | 0.0000 |
| 2 | | 116.10 | 0.00 | 10.16 | −0.9962 | 0.0000 | −0.0872 | 0.0000 | −1.0000 | 0.0000 |
| 3 | Polygon Mirror | 0.00 | 0.00 | 0.00 | −1.0000 | 0.0000 | 0.0000 | 0.0000 | −1.0000 | 0.0000 |
| 4 | Photoreceptor Surface | 417.00 | 0.00 | −37.00 | 1.0000 | 0.0000 | 0.0000 | 0.0000 | 1.0000 | 0.0000 |

Surface No. 1 denotes the surface of the axisymmetric aspherical lens 15 closer to the light source 12. Surface No. 2 denotes the surface of the axisymmetric aspherical lens 15 closer to the deflector 18. Surface No. 3 denotes the reflecting surface of the polygon mirror that reflects the beam B0 at a deflection angle θ of 0 degrees. Surface No. 4 denotes the photoreceptor surface (the surface of the photosensitive drum 20).

Surface No. 1 is a spherical surface and has a curvature of $4.33126 \times 10^{-3}$.

Surface No. 2 is an axisymmetric aspherical surface and has a curvature of $-7.01834 \times 10^{-2}$. The shape of Surface No. 2 is expressed by the expression (1) above, and the coefficients are shown by Table 9 below.

TABLE 9

| Degree | Coefficient |
| --- | --- |
| 4 | $3.16227 \times 10^{-5}$ |
| 6 | $1.22161 \times 10^{-10}$ |
| 8 | $2.16396 \times 10^{-9}$ |
| 10 | $2.15187 \times 10^{-11}$ |
| 12 | $-2.55070 \times 10^{-13}$ |

All coefficients except for the coefficients shown in Tables 8 and 9 are 0.

Computer simulations were performed on the fourth example of the optical scanning device 10. Here also, the optical scanning device used as the second comparative example was used for comparison. The second comparative example has been already described, and the description is not given here.

Figure 36:
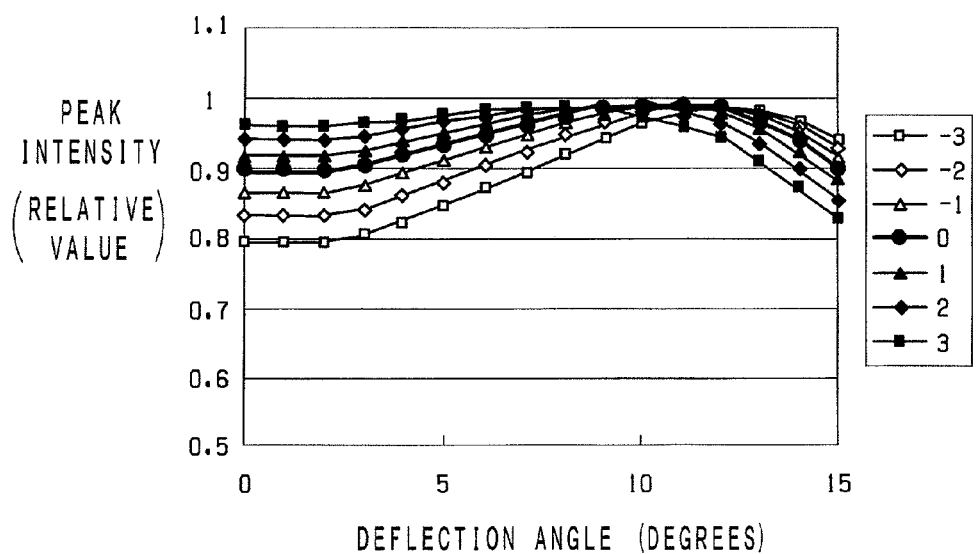
FIG. 36 is a graph showing results of the first computer simulation performed on a fourth example of the optical scanning device.
Figure 37:
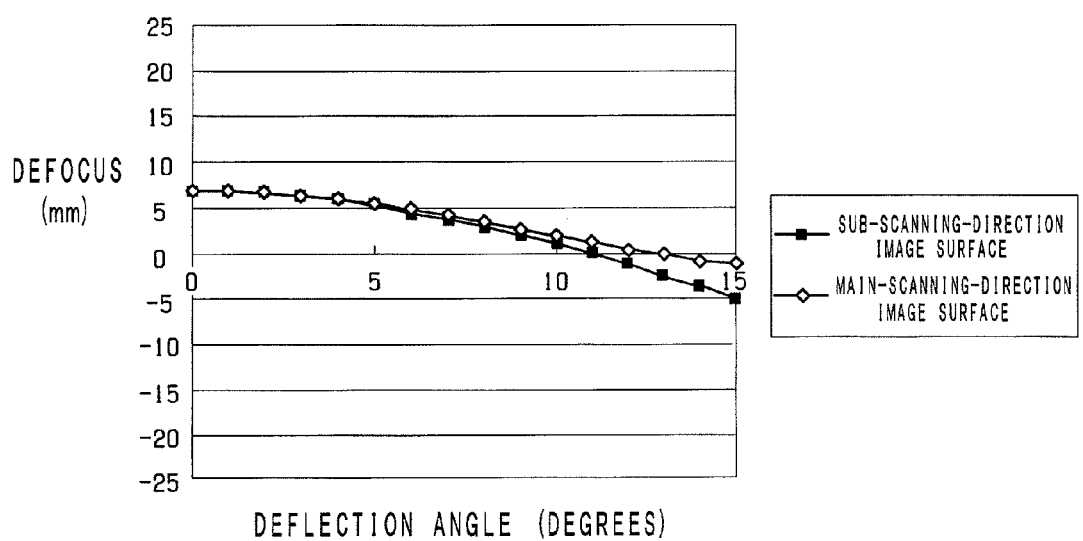
FIG. 37 is a graph showing results of the second computer simulation performed on the fourth example of the optical scanning device.
Figure 38:
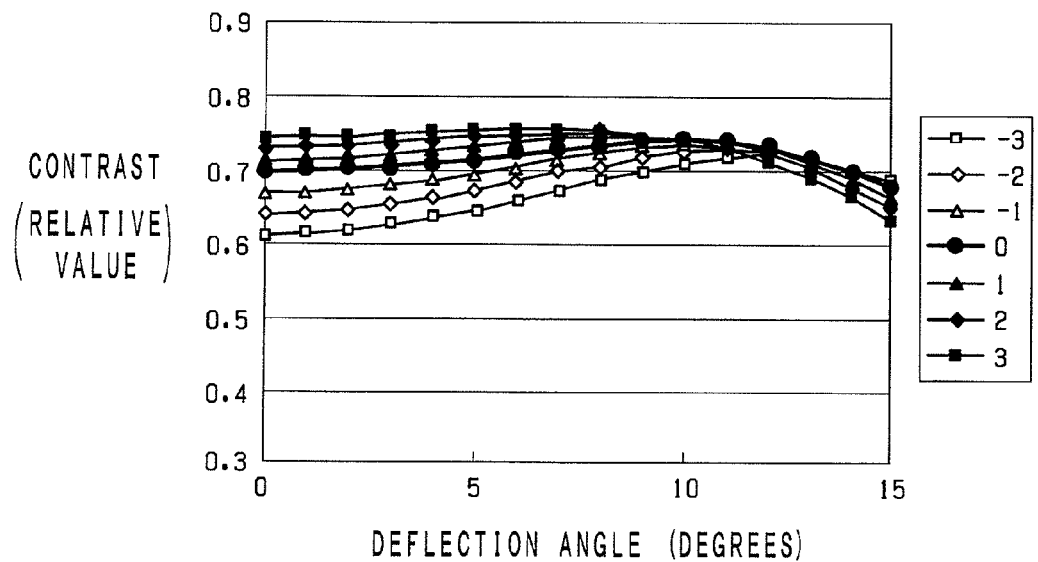
FIG. 38 is a graph showing the relationship between vertical-line contrast and deflection angle θ in the fourth example of the optical scanning device.
Figure 39:
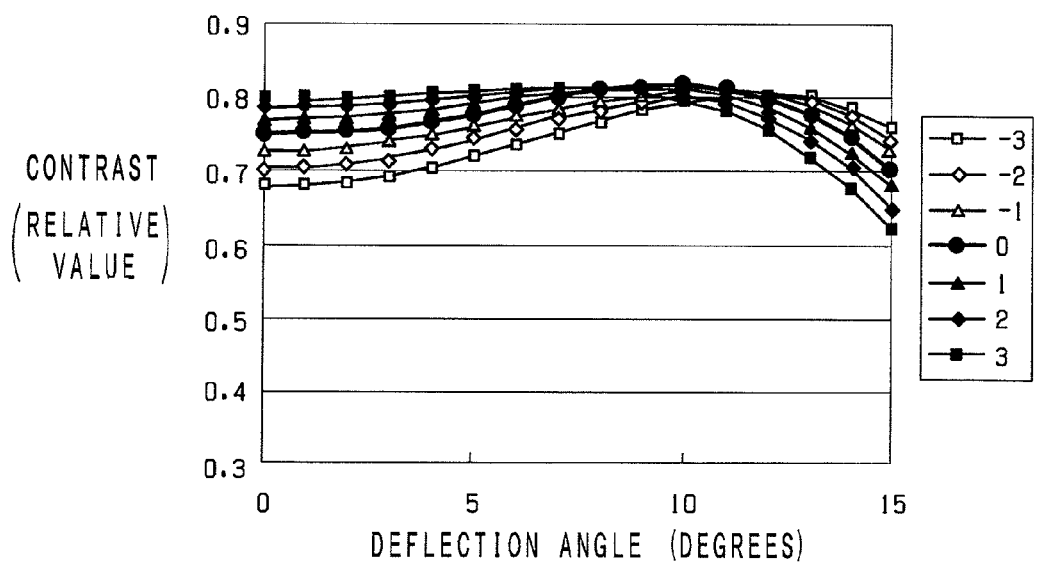
FIG. 39 is a graph showing the relationship between horizontal-line contrast and deflection angle θ in the fourth example of the optical scanning device.
Figure 40:
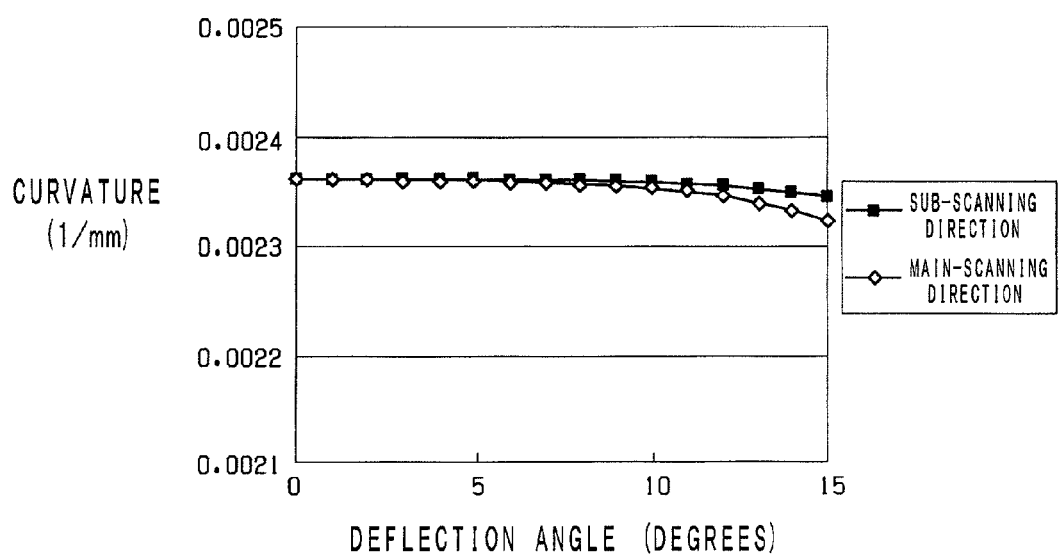
FIG. 40 is a graph showing results of the fourth computer simulation performed on the fourth example of the optical scanning device.

The above-described first to fourth computer simulations were performed on the fourth example of the optical scanning device 10. FIG. 36 shows results of the first computer simulation performed on the fourth example of the optical scanning device 10. FIG. 37 shows results of the second computer simulation performed on the fourth example of the optical scanning device 10. FIG. 38 shows the relationship between the vertical-line contrast and the deflection angle θ in the fourth example of the optical scanning device 10. FIG. 39 shows the relationship between the horizontal-line contrast and the deflection angle θ in the fourth example of the optical scanning device 10. FIG. 40 shows results of the fourth computer simulation performed on the fourth example of the optical scanning device.

As shown by FIGS. 36 to 40, the results of the first to fourth computer simulations performed on the fourth example of the optical scanning device 10 are similar to those of the simulations performed on the third example of the optical scanning device 10.

Thus, the optical scanning devices 10 according to the embodiments above are less costly to manufacture.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An optical scanning device for scanning a photoreceptor surface with a beam, said optical scanning device comprising:
   a light source for emitting the beam;
   an optical system for causing the beam emitted from the light source to converge;
   a deflector that includes a polygon mirror with a plurality of reflecting surfaces and that deflects the beam that has passed through the optical system by rotations of the polygon mirror;
   wherein no optical system for causing the beam to converge or diverge is disposed between the deflector and the photoreceptor surface;
   wherein the optical system generates spherical aberration depending on which part of the optical system in a main-scanning direction the beam passes through; and
   wherein the beam enters into three or more adjacent reflecting surfaces of the polygon mirror at a time.

2. An optical scanning device according to claim 1, wherein the optical system has an optical property to cause the beam to have a smaller average wavefront curvature when being directed to both edges in the main-scanning direction of the photoreceptor surface than when being directed to a center in the main-scanning direction of the photoreceptor surface.

3. An optical scanning device according to claim 1, wherein the beam enters into an entire length in the main-scanning direction of at least one reflecting surface of the plurality of reflecting surfaces during scanning on the photoreceptor surface.

4. An optical scanning device according to claim 1, wherein the reflecting surfaces are planes.

5. An optical scanning device according to claim 1, wherein the optical system comprises an optical element of a rotationally asymmetric shape.

6. An optical scanning device according to claim 5,
   wherein the optical element has two symmetric surfaces of which normal lines are orthogonal to each other; and
   wherein the normal line of one of the two symmetric surfaces is orthogonal to a rotation axis of the polygon mirror of the deflector.

* * * * *